(12) United States Patent
Abekawa

(10) Patent No.: US 6,557,669 B2
(45) Date of Patent: May 6, 2003

(54) AUTOMATIC DISH SERVING SYSTEM

(75) Inventor: Katsuyoshi Abekawa, Chigasaki (JP)

(73) Assignee: Asa Co., Ltd., Chigasaki (JP)

( * ) Notice: Subject to any disclaimer, the term of this patent is extended or adjusted under 35 U.S.C. 154(b) by 0 days.

(21) Appl. No.: 09/796,657

(22) Filed: Jun. 11, 2001

(65) Prior Publication Data

US 2001/0037915 A1 Nov. 8, 2001

(30) Foreign Application Priority Data

Mar. 2, 2000 (JP) ........................................ 2000-061867

(51) Int. Cl.$^7$ ................................................. E04H 3/04
(52) U.S. Cl. ............................ 186/45; 186/38; 108/22
(58) Field of Search ........................ 186/27, 38, 45–50; 705/15; 108/20–22

(56) References Cited

U.S. PATENT DOCUMENTS

| | | | | | |
|---|---|---|---|---|---|
| 2,569,366 A | * | 9/1951 | Bailey | ........................ | 186/44 |
| 3,464,363 A | * | 9/1969 | Wishart | .................... | 104/88.06 |
| 4,019,605 A | * | 4/1977 | Kropf | .......................... | 104/127 |
| 4,060,038 A | * | 11/1977 | Ruvolo | ...................... | 108/104 |
| 4,190,134 A | * | 2/1980 | Kato | ............................ | 186/46 |
| 4,899,666 A | * | 2/1990 | Meier | ...................... | 104/172.3 |
| 5,421,271 A | * | 6/1995 | Sui | .............................. | 108/20 |
| 5,937,764 A | * | 8/1999 | Olivier | ........................ | 108/20 |
| 6,427,806 B1 | * | 8/2002 | Tanaka | ......................... | 186/49 |

\* cited by examiner

*Primary Examiner*—Dean J. Kramer
(74) *Attorney, Agent, or Firm*—Young & Thompson

(57) ABSTRACT

The automatic dish serving system includes: a supply center for supplying articles such as food and drink; a customer's seat to which the articles are served; a carrier wagon traveling along a route between the supply center and the customer's seat for carrying the articles of food and drink loaded on the carrier wagon; and a route guide device for guiding the carrier wagon so as to take an appropriate route, wherein the customer's seat is provided with a turntable for retaining the served articles of food and drink and provided with an arrival portion to which the carrier wagon arrives and wherein the carrier wagon is provided with a transfer device for transferring the articles between the turntable and the carrier wagon.

11 Claims, 15 Drawing Sheets

AUTOMATIC DISH SERVING SYSTEM

BACKGROUND OF THE INVENTION

1. Field of the Invention

The present invention relates to an automatic dish serving system capable of effectively serving dishes including food and drink to customers at restaurant or the like.

2. Description of the Related Art

The inventors of the present invention had developed a dish serving system capable of serving the dish including food and drink to customers in a short time without requiring to pass through many hands in comparison with the conventional dish serving systems such as, so called, Viking-system (smorgasbord system), or dish circulating system that had been conventionally adopted at restaurant and sushi-bar or the like. For example, in the dish circulating system adopted at the sushi-bar, a number of sushi pieces (fish on vinegared rice) are circulated around the customer's seats by successively carrying the sushi pieces by means of conveyers. Such systems had been disclosed in Japanese Patent Application Laid-Open (Unexamined) No. HEI 10-113115.

However, such dish serving systems had raised problems that a conveyor occupies a large space for the restaurant or the like having a limited narrow space, and an area to which the dishes including foods and drinks are served was also limited to a narrow range. The inventors of the present invention had further advanced the research for improving the dish serving system in order to solve the aforementioned problems.

SUMMARY OF THE INVENTION

An object of the present invention is to provide an automatic dish serving system capable of effectively serving dish including food and drink to customers and having an excellent mobility.

In order to achieve the aforementioned object, the present invention provides an automatic dish serving system comprising: a supply center for supplying dish articles such as food and drink to a customer's seat to which the articles are served; a carrier wagon traveling along a route between the supply center and the customer's seat for carrying the dish articles of food and drink loaded on the carrier wagon; and a route guiding means for guiding the carrier wagon so as to take an appropriate route, wherein the customer's seat is provided with a turntable for retaining the served dishes of food and drink, and provided with an arrival portion to which the carrier wagon arrives; and wherein the carrier wagon is provided with a transfer means for transferring the dish articles between the turntable and the carrier wagon.

Further, in the above dish serving system, it is preferable that the transfer means of the carrier wagon is provided with a conveyor movable in forward and backward direction of the carrier wagon, and a front portion of the carrier wagon is provided with a table entering portion for entering a peripheral portion of the turntable into a portion inside from a front end surface of the carrier wagon so that the peripheral portion of the turntable can be approached to a portion close to a top portion of the conveyer.

In addition to the above requirements, it is preferable that the dish serving system further comprises a tray for performing a transfer of the dish articles such as food and drink between the carrier wagon and the turntable, while a wrapping connector of the conveyor is provided with an engaging hook for engaging with an engaging portion formed to the tray, so that the engaging hook is engaged with the engaging portion thereby to withdraw the tray.

Furthermore, in addition to the above requirements, it is preferable that the dish serving system further comprises: a loading state judging means provided to the carrier wagon for judging whether the dish article is loaded on the carrier wagon or not; a retaining state judging means for judging whether the dish article is retained on the turntable or not; and a table turning means provided at a front portion of the carrier wagon for turning the turntable in response to a signal from the retaining state judging means; wherein the conveyor of the transfer means transfers the dish articles between the carrier wagon and the turntable in response to signals from the loading state judging means and the retaining state judging means.

Further, in the above dish serving system, it is preferable that the carrier wagon further comprises a sound generating means for generating a sound in response to signals from the loading state judging means and the retaining state judging means.

Furthermore, it is preferable that the route guiding means comprises: a memory means for memorizing traveling route data for the carrier wagon to travel; and a computer capable of reading out the data from the memory means; wherein the automatic dish serving system comprises a plurality of customer's seats and each of the customer's seats is allotted with a different identification code, the carrier wagon comprises an inputting means for inputting the identification code of the customer's seat to which the dish including food and drink should be served, the carrier wagon travels along a traveling route ranging from a route previously set for the carrier wagon to a route selected by the route guiding means in response to a signal form the inputting means.

Furthermore, in the above automatic dish serving system, it is preferable that the route guiding means further comprises: a signal transmitting means provided at a predetermined portion of a system site for transmitting a signal to the carrier wagon; a position calculating means provided to the carrier wagon for calculating a position of the carrier wagon in the system site by receiving the signal from the signal transmitting means; and a travel controlling means for controlling a traveling device for the carrier wagon on the basis of a result obtained by calculating a positional relation between an actual position of the carrier wagon calculated by the position calculating means and a destination point in the system site.

Further, it is also preferable that the carrier wagon further comprises: an obstacle detecting means for detecting obstacle existing in front of the carrier wagon; and an obstacle bypassing means for controlling the traveling of the carrier wagon so as to bypass the obstacle in response to a signal from the obstacle bypassing means.

Furthermore, in addition to the above requirement, it is also preferable that the dish serving system further comprises: an outer controller for remotely controlling the carrier wagon; a transmitting means for transmitting a signal to the carrier wagon, the signal corresponding to an operation of the outer controller; a receiving means provided to the carrier wagon for receiving the signal from the transmitting means; and a controlling means for controlling a movement of the carrier wagon in response to the signal received by the receiving means, wherein the carrier wagon performs a processing corresponding to the signal from the controlling means by giving the processing priority over all the other processing.

In addition, it is also preferable that the customer's seat comprises a leftover withdrawing (recovering) system for withdrawing from the table an empty dish and tableware left on the table.

Further, it is also preferable that at least one wagon for loading the dish articles is further coupled to the carrier wagon. It is more preferable that the carrier wagon is provided with an adjusting means for adjusting a vertical position of the conveyor.

DETAILED DESCRIPTION OF THE PREFERRED EMBODIMENTS

Next, the preferred embodiments of the present invention will be described with reference to the accompanying drawings.

First Embodiment

Figure 1:
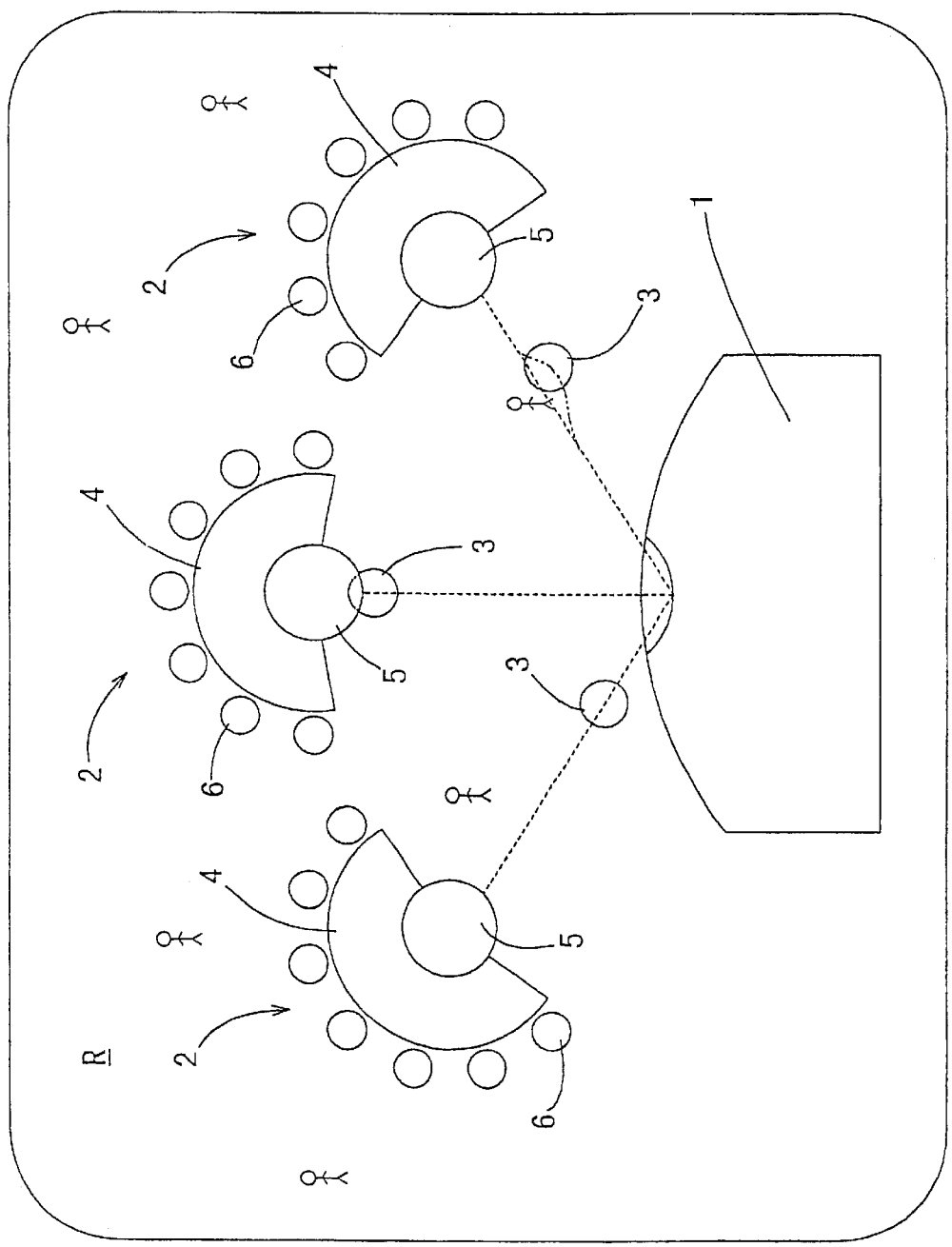
FIG. 1 is a plan view showing one embodiment of a restaurant to which an automatic dish serving system according to the present invention is applicable.

FIG. 1 shows an entire restaurant R to which an automatic dish serving system according to the present invention is applied. In this restaurant R, there are provided a kitchen 1 constituting a supply center for supplying dishes of meals including food and drink, and customer's seats 2—2 arranged at positions in the radial direction from the kitchen 1, wherein carrier wagons 3—3 are going back and forth between the kitchen 1 and the customer's seats 2—2. Each of the customer's seats 2—2 comprises: an outer table 4 formed in a semi-circular-shape; a circular-disk shaped turntable 5 provided at a center portion of the outer table 4; and a plurality of seats 6—6 on which customers sit. Each of the customer's seats is laid out so that a peripheral side of the outer table 4 formed in a flat shape faces to the kitchen 1, while a plurality of the seats 6—6 are provided along a peripheral side of the outer table 4 formed in a circular shape. Further, the turntable 5 is used for retaining dishes of meals including food and drink that are carried from the kitchen 1 by carrier wagons 3—3, and the turntable 5 is provided so as to freely turn along a horizontal surface at a center of the customer's seat 2—2.

In this regard, in the restaurant R using this automatic dish serving system as shown in FIG. 1, a safe guard and fence or the like are not specifically provided at portion where the carrier wagon 3—3 are traveling between the kitchen 1 and the customer's seats 2—2, so that persons can freely enter and pass through the portion.

Figure 2:
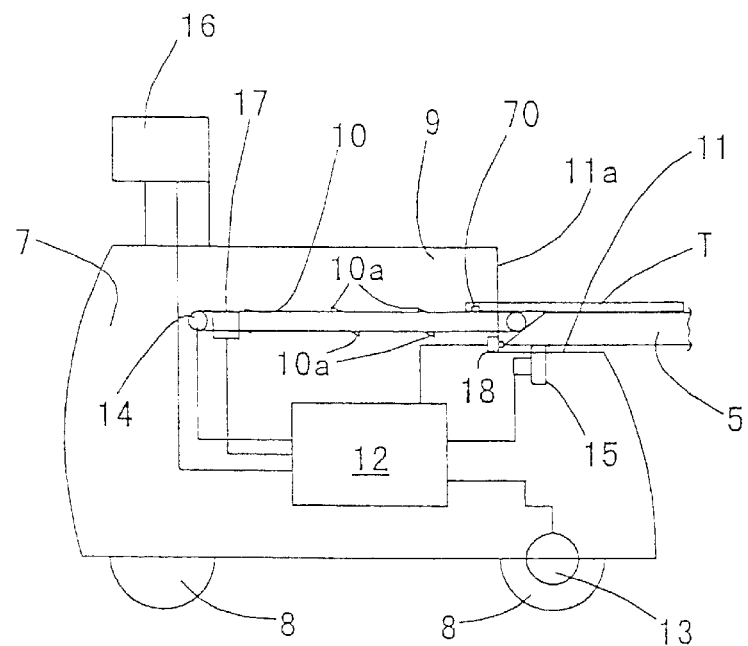
FIG. 2 is a side view showing one embodiment of a carrier wagon to be used in the automatic dish serving system according to the present invention.
Figure 3:
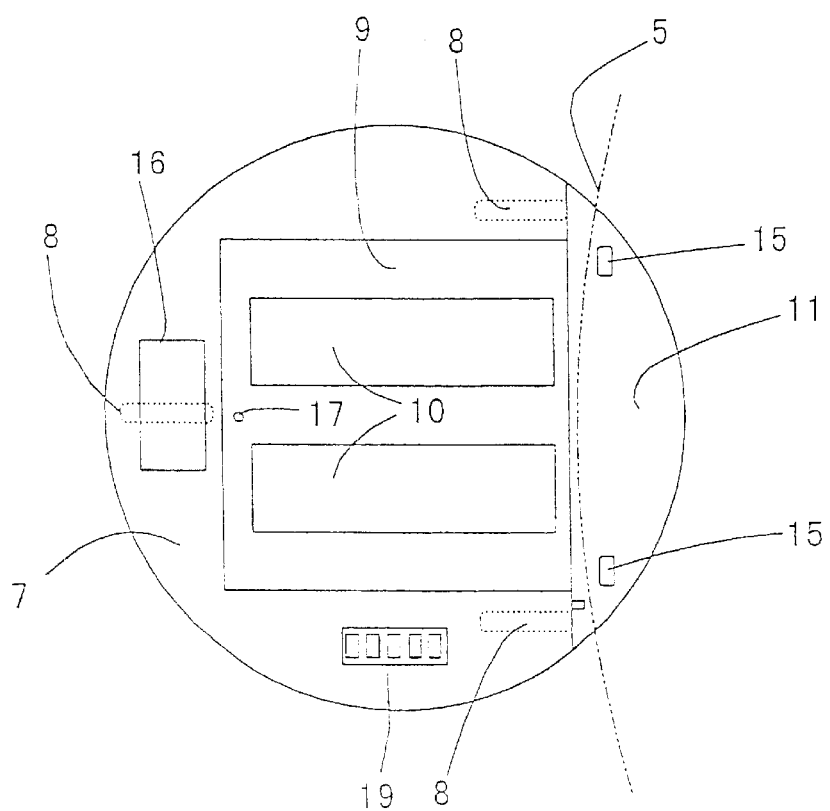
FIG. 3 is a plan view showing the carrier wagon shown in FIG. 2.

FIGS. 2 and 3 show an outline of the carrier wagon 3 which travels back and forth between the kitchen and the customer's seat for serving dishes of meals including food and drink to the customer's seat, and for returning a finished tableware or the like to the kitchen from the customer's seat. The carrier wagon 3 is formed so as to have an entire configuration like a large ladybug, and comprises wheels 8—8 for traveling a body 7 and the carrier wagon 3. Two wheels are provided to a front portion of the carrier wagon while one wheel is provided to a rear portion, thus three wheels are provided in total. A driving motor 13 is equipped to a front wheel portion, thus constituting a front-wheel drive mechanism. A change of direction or course of the carrier wagon is performed by steering the rear wheel 8.

An upper central portion of the body 7 is recessed to have a rectangular-shape thereby to form a loading portion 9 for loading the food and drink to be carried. The loading portion 9 is formed so that a width and a length from a front surface of the loading portion 9 are larger than peripheral sizes of the tray T to be used so as not to allow the tray T to fall from the loading portion 9 when the dishes of meals with tray T are loaded on the loading portion 9 and carried.

Further, at a bottom surface of the loading portion 9 is provided with conveyors 10, 10 for transferring the dishes of meals together with tray T loaded on the loading portion between the loading portion 9 and the turntable 5. Although the figure shows a front-wheel drive and rear-wheel steering type carrier wagon, the carrier wagon is not limited thereto, and various types such as a rear-wheel drive and front-wheel steering type, a front-wheel drive and front-wheel steering type, a rear-wheel drive and rear-wheel steering type may be also used. Furthermore, in order to realize a small turning circle for the carrier wagon, both rear and front wheels can be also provided so as to be steered. Regarding how to provide the wheel, one wheel may be provided at the front portion while two wheels may be provided at the rear portion of the carrier wagon. Further, two wheels may also be provided to each of the rear and front portions respectively.

At a front portion of the carrier wagon 3 is provided with a table entering portion 11 formed by cutting out an upper portion of the carrier wagon. When the carrier wagon 3 arrives at a customer's seat, this table entering portion 11 is used for entering a peripheral portion of the turntable 5 to inside a front end portion of the carrier wagon 3 and for getting the peripheral portion of the turntable 5 close to a portion immediately before a top portion of the conveyors 10, 10. That is, the peripheral portion of the turntable 5 gets close to a portion immediately before the conveyors 10, 10, so that a gap formation therebetween is prevented, whereby the dishes of meals including food and drink loaded on the loading portion 9 can be smoothly arranged on the turntable 5. A peripheral portion of the turntable 5 is formed with an inclined surface so that a lower surface of the turntable 5 is broader than an upper surface thereof.

Next, various components constituting the controlling means provided for the carrier wagon 3 will be explained hereunder. The carrier wagon 3 comprises: a controller 12 for controlling actuators provided for the carrier wagon 3; a traveling motor 13 for driving wheels 8—8 of the carrier wagon 3; a driving motor 14 for driving the carrying conveyors 10, 10 and turning rollers 15, 15 for turning the turntable 5. Further, the carrier wagon 3 is equipped with various detecting/judging means for detecting/judging surrounding circumstances. That is, at a front portion of the carrier wagon 3 is provided with a camera for judging whether objects such as people or articles exist or not in front of the carrier wagon, and the carrier wagon 3 comprises: a limit switch 17 constituting a loading state judging means for judging whether the articles such as food and drink are loaded on the loading portion or not; and a limit switch 18 for detecting whether an end surface 11a of the table entering portion 11 abuts against a peripheral portion of the turntable.

In addition, the carrier wagon 3 is also provided with an input switch 19 for selecting a customer's seat to which the dishes of meals or the like cooked at the kitchen should be served. In this connection, when the carrier wagon 3 is traveling, the camera 16 takes a role as a sensor of an obstacle detecting means for detecting the obstacles existing in front of the carrier wagon. When the carrier wagon 3 is stationed at the customer's seat, the camera 16 takes a role as a sensor of a retaining state judging means for judging whether the articles are retained on the turntable or not.

For example, in a case where tall articles such as beer bottle or the like having a relatively large height are loaded on the carrier wagon 3 and then carried, the camera 16 takes a picture of a neck portion of the beer bottle, which may cause a fear of the beer bottle being misidentified as an obstacle. In order to prevent such disadvantage, it is preferable that the camera 16 is formed to be adjustable in height direction, or the camera 16 is provided so as to be movable on an upper surface of the carrier wagon 3. In addition, another camera as a sensor of the obstacle detecting means may be separately disposed to the front surface portion of the carrier wagon 3.

Figure 4:
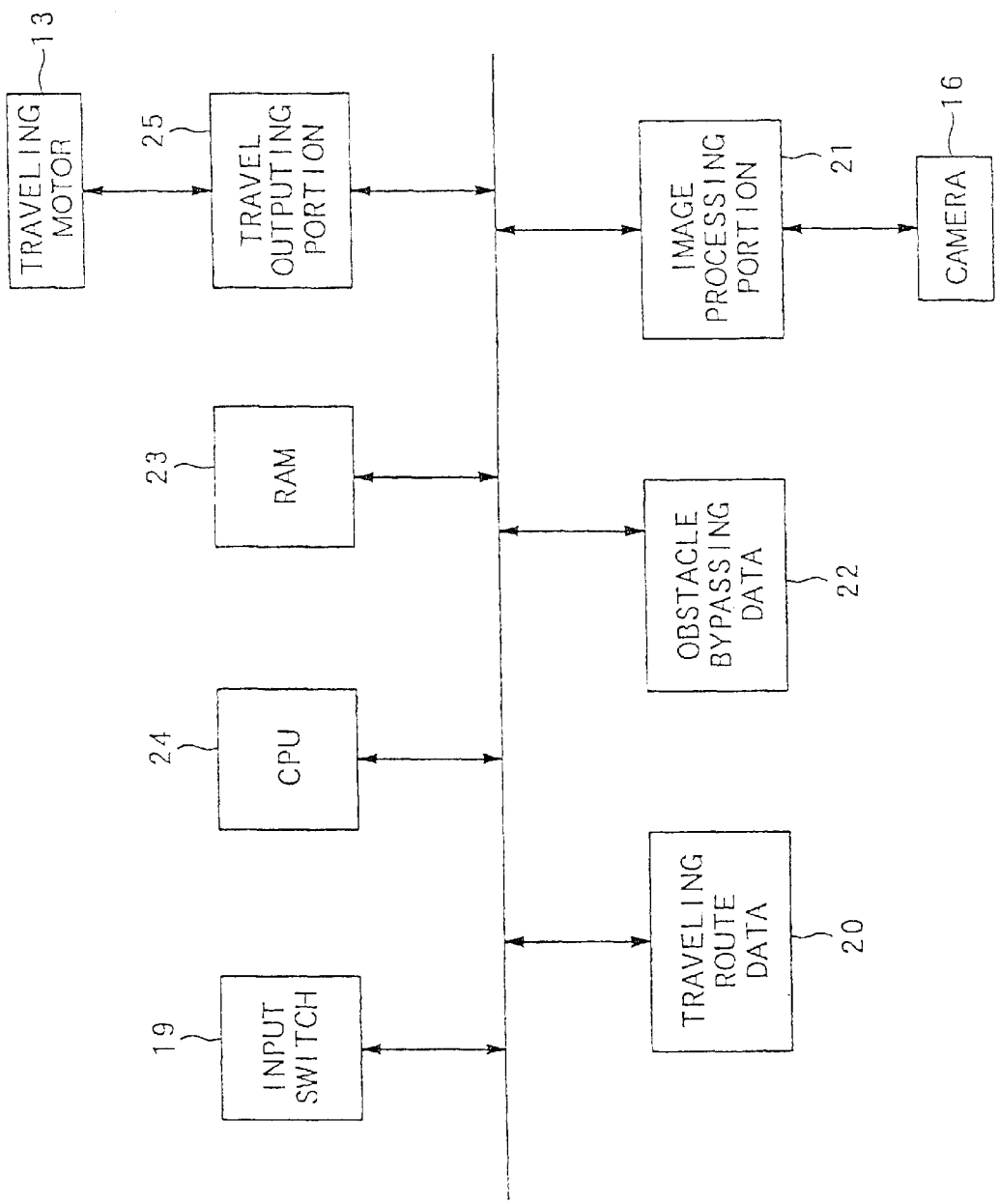
FIG. 4 is a block diagram showing a traveling control of the carrier wagon shown in FIG. 2.

At first, a travel controlling system for controlling the travel of the carrier wagon 3 will be explained hereunder with reference to FIG. 4. The controller for controlling the travel of the carrier wagon 3 comprises: a ROM (read-only memory) device 20 as a memory means into which a traveling route for the carrier wagon 3 as a traveling route guiding means is previously inputted; an image data processing portion 21 for processing image data from the camera 16 as the obstacle detecting means for taking a picture of an image in front of the carrier wagon 3; a ROM device 22 as a memory means into which an obstacle bypassing data for bypassing the obstacle existing in front of the carrier wagon as an obstacle bypassing means is previously inputted; a RAM (random access memory) device 23 for non-periodically writing data from the above means and devices; a CPU 24 for sequentially processing the data written in the RAM device 23; and a travel outputting portion 25 for outputting a processed value to the traveling motor 13.

At the time of serving the dishes to the customer's seat, when a number of the table to which the dishes should be served is inputted by means of the input switch 19, a corresponding traveling route data is read out from the memorized traveling route data, so that the carrier wagon 3 travels on the basis of the read-out data. In this regard, the ROM device to which the traveling route and the obstacle bypassing data are inputted is not specifically limited to a built-in type, and there can be also adopted an exterior-type ROM device comprising a CD-ROM and a readout device for reading out data from the CD-ROM.

Figure 5:
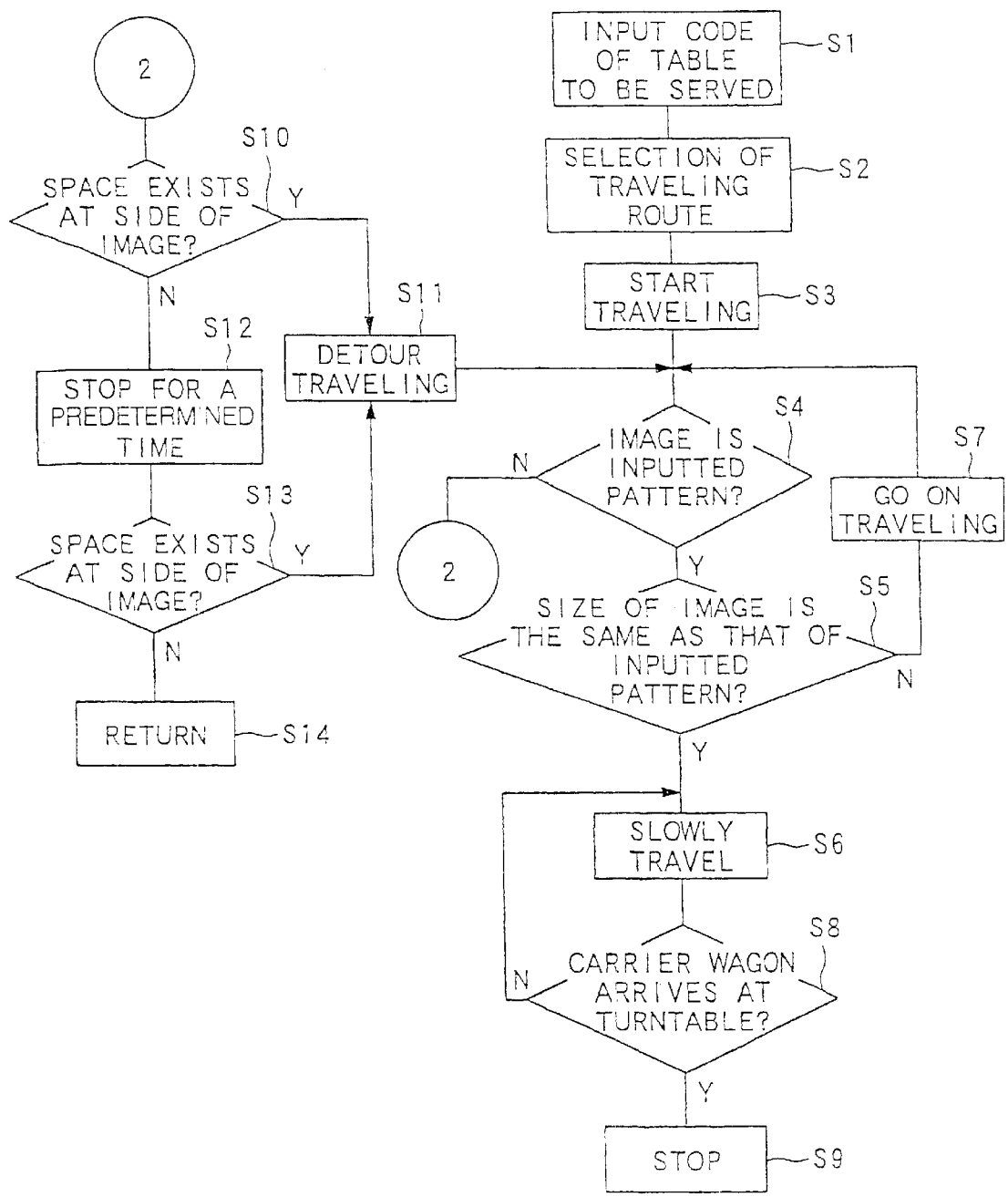
FIG. 5 is a flow diagram showing a traveling control of the carrier wagon shown in FIG. 2.

By the action of the above respective means and devices, the carrier wagon travels from the kitchen to the table to which the dishes of meals or the like should be served in accordance with a flow diagram shown in FIG. 5. That is, at first, the number of the table to which the dishes or the like should be served is inputted at the kitchen by the input switch provided for the carrier wagon (S1). Then, a traveling route corresponding to the number is selected from the ROM device, and the traveling motor is controlled so that the carrier wagon travels along the traveling route (S2, S3). During the traveling, the camera mounted to the carrier wagon takes a picture ahead, and an image data taken by the camera is then processed by the image data processing device thereby to judge a distance to the objective table and whether the taken image indicates obstacles such as table, person or not.

In the image data processing portion, a picture pattern of the customer's seat previously taken from a camera station of the kitchen is inputted, the image taken during the traveling of the carrier wagon is always compared with the above picture pattern (S4). When an image different from the above inputted picture pattern is taken by the camera during the traveling, the image data processing portion judges that an obstacle is existing ahead (S4). In addition, a size of the picture pattern of the customer's seat previously taken from a predetermined camera station relatively close to the customer's seat is also inputted in the image data processing portion, when the traveling of the carrier wagon is advanced and the size of the customer's seat taken by the camera is compared (S5) and is coincident with the size of the inputted customer's seat, the carrier wagon is controlled to slowly travel (S6). When the size of the customer's seat taken by the camera is smaller than the size of the inputted customer's seat, the carrier wagon is judged not to arrive to a predetermined position yet, then the carrier wagon keeps on traveling as it is (S7). When the carrier wagon slowly travels and the limit switch provided for the front end portion of the carrier wagon abuts against the customer's seat, the carrier wagon stops traveling (S8, S9).

When the image taken by the camera is not coincident with the inputted picture pattern to thereby judge that there exists an obstacle ahead (S4), at first, whether there is a space to some extent enabling the carrier wagon to pass through a side region of the taken image of the obstacle is judged (S10). If there is a space capable of being passed through, a detour traveling data for making a detour to avoid the obstacle and for traveling is selected from the ROM device to which an obstacle bypassing data are previously inputted (S11).

For example, the above detour traveling data is formed by previously inputting the data for realizing the carrier wagon to bypass the obstacle in such a manner that: the carrier wagon changes its direction to a right-ahead direction deviated at 30 degrees from the ahead direction and travels; then the carrier wagon forwardly travels as it is until the obstacle becomes not to be recognized by the camera; then, after bypassing the obstacle, the carrier wagon travels in a left-ahead direction to thereby again return to the original traveling route.

On the other hand, if there is no space for passing through the side region of the obstacle, the carrier wagon comes to a brief stop (S12). Then, even after a predetermined time has passed, the obstacle still exists and there is not formed a space for the carrier wagon to pass through, the carrier wagon is programmed so as to return to the kitchen (S13, 14). In this regard, the obstacle bypassing data described above is merely one example, and it goes without saying that the data can also be inputted so that the carrier wagon bypasses the obstacle through another way.

Next, a control operation at a time when the carrier wagon transfers a tray or the like loaded with dishes of meals will be explained hereunder.

Figure 6:
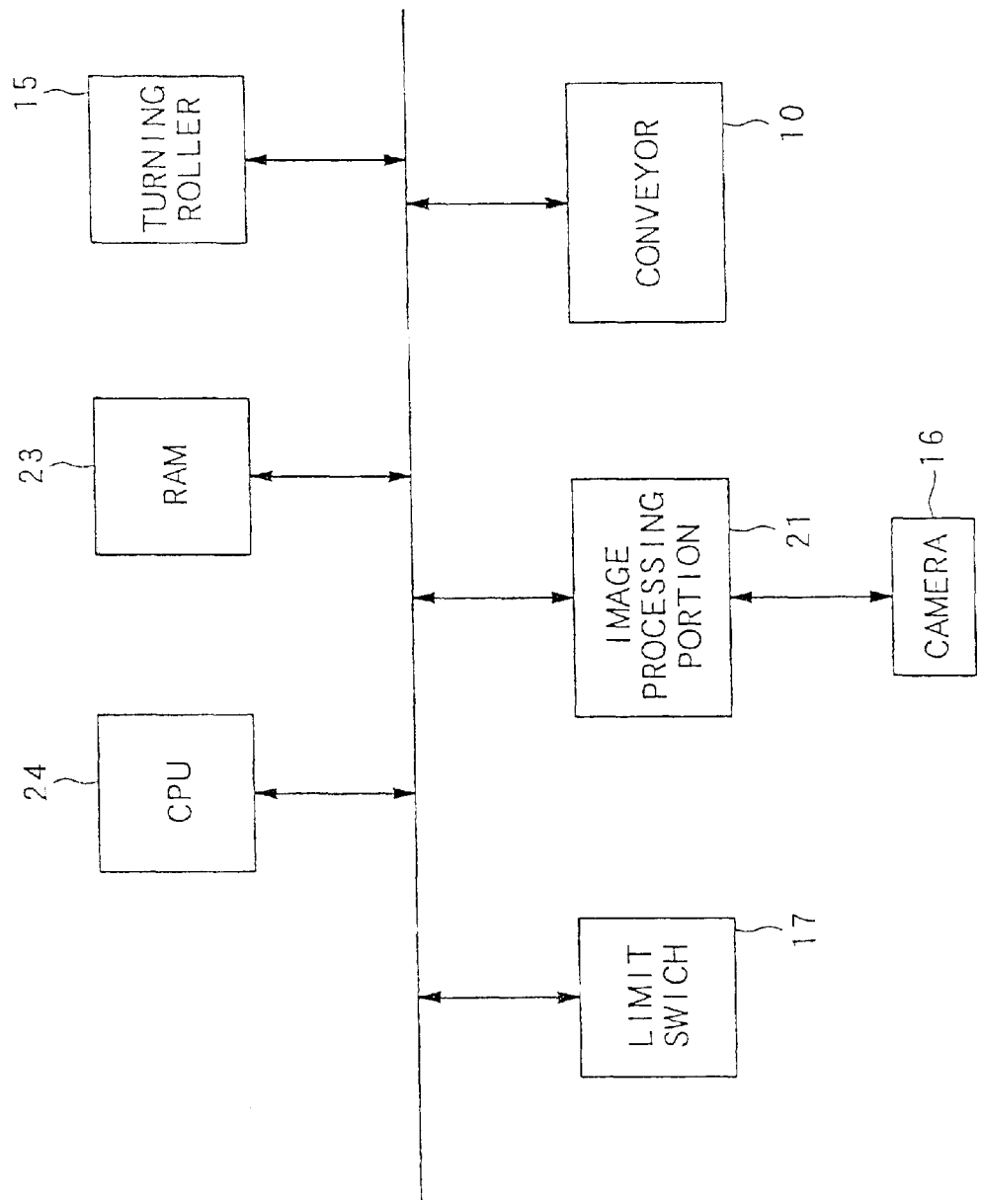
FIG. 6 is a block diagram showing a control system for controlling a transfer of the dish articles between the carrier wagon and a turntable at the customer's seat.

As shown in FIG. 6, the above carrier wagon comprises: an image processing portion 21 for processing an image data from the camera 16 constituting the retaining state judging means so as to judge whether dishes or the like left on the turntable are existing or not; a limit switch 17 of the loading state judging means for judging whether the articles such as tray or the like are loaded or not, the limit switch being disposed to a bottom portion of the loading portion of the carrier wagon; a turning roller 15 (reference numeral 15 in FIG. 2) for turning the turntable; and conveyors 10 (see FIG. 3) for transferring the tray or the like from the carrier wagon to the turntable or for taking the tray or the like into the loading portion of the carrier wagon. These operational data are sequentially written into the RAM device 23, then, processed by the CPU 24.

When the dishes of meals loaded on the carrier wagon at the kitchen are sent out from the carrier wagon to the turntable, at first, the camera 16 provided for the carrier wagon takes a picture of an upper surface of the turntable and the obtained data is processed by the image processing portion 21. Then, on the basis of the image data, whether there is the tray or the like left at this side of the turntable or not is judged. If there is no article left at this side of the turntable and there is a space for placing the carried dishes of meals, the conveyor 10 is driven to send out the dishes together with tray loaded on the loading portion to the turntable.

On the other hand, if it is judged that there is no space for placing the meals, the turning roller 15 is driven to turn the turntable while the upper surface of the turntable is monitored by the camera 16. Then, when the article left at this side of the turntable is out of a visual sight of the camera, the turning roller 15 is stopped. Subsequently, the conveyor is driven to send out the loaded dishes from the carrier wagon to the turntable. In this connection, in a case where the space for placing the dishes cannot be found even if the turntable makes a full turn, an alarm sound generating means provided for the carrier wagon is operated so as to draw attentions of peoples seating on the customer's seats so that the customer should share a space on the table or the customer should pick up the dishes loaded on the carrier wagon.

In contrast, returning to FIG. 2, in a case where the carrier wagon withdraws (recovers) the tray loaded with empty dishes at the customer's seat, the conveyor 10 is reversely moved and an engaging hook 10a provided for a belt of the conveyor is engaged with an engaging groove 70 formed to a lower surface of the tray T whereby the tray T is took into the loading portion 9 of the carrier wagon 3. At this time, since the limit switch 17 previously detects whether the loading portion 9 is loaded with another tray or the like loading another dish or not, another tray can be prevented from being repeatedly loaded on the loading portion.

In this regard, as the conveyor to be provided for the carrier wagon, there can be used various wrapping-type transmission devices such as: a conveyor formed by wrapping a belt between a pair of belt wheels; a conveyor consisting of a combination of sprockets and a chain; and a conveyor consisting of a combination of a wire rope and sieves; or the like. In the above transmission devices, the belt, chain and wire rope are wrapping connectors. Further, as the sensor constituting the loading state judging means, the sensor is not limited to a contact-type sensor such as a limit switch or the like, a non-contact-type sensor such as an infra-red rays sensor or the like can be also used.

In the automatic dish serving system of the present invention, a plurality of monitoring cameras are provided in the restaurant, and a television monitor displaying the image taken by the cameras is provided at the kitchen, so that the movement of the carrier wagon can be monitored all the time. In addition, the kitchen is provided with a wireless controller for remotely controlling the carrier wagon, and the carrier wagon is provided with a receiver for receiving a signal transmitted from the wireless controller, so that the carrier wagon can be remotely controlled. For example, in a case when some kind of trouble is happened to the carrier wagon and the wagon cannot self-advances, it is possible for an operator in the kitchen to muddle through such the situation by remotely controlling the carrier wagon while the operator is watching the image displayed on the monitor.

In this case where there is no trouble, the carrier wagon acts and moves in accordance with the controlling operation of the controller provided to the carrier wagon. However, when the receiver receives a signal transmitted from the wireless controller, all of the programs of automatic control is forcibly terminated, and all of the actuators provided for the carrier wagon follows and acts on all the signals transmitted from the wireless controller.

Second Embodiment

Figure 7:
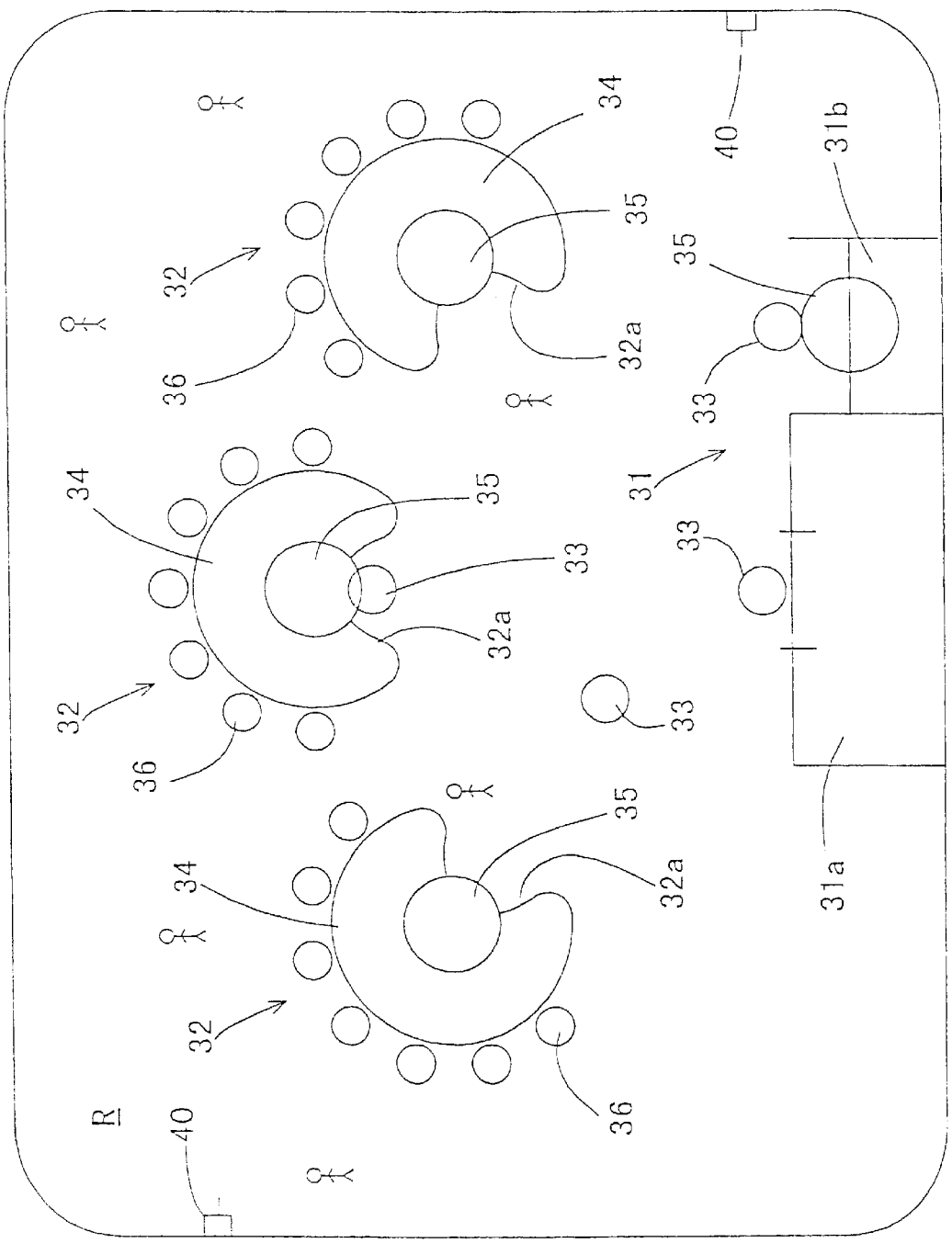
FIG. 7 is a plan view of a restaurant using another embodiment of an automatic dish serving system according to the present invention is applied, the dish serving system being different from that shown in FIG. 1.

FIG. 7 shows one embodiment of a restaurant R to which an automatic dish serving system according to the present invention is applied. In this embodiment, the restaurant also comprises: a kitchen 31 constituting a supply center for supplying dishes of cooked meals; customer's seats 32—32 at which the customer takes the ordered meal and drink; and carrier wagons 33—33 going back and forth between the kitchen 31 and the customer's seat 32 for carrying the dishes and the empty dishes or the like.

The kitchen 31 comprises: a headquarter 31a for cooking the ordered meal and for loading the cooked meal on the carrier wagon; and a returning division 31b for returning the tablewares and plates after taking the meals, the returning division 31b being arranged so as to be adjacent to the headquarter. The returning division 31b is provided with a turntable 35 for placing the tablewares carried from the customer's seats 32—32 by the carrier wagon 33.

On the other hand, the customer's seats 32 are arranged at positions radially from a center of the kitchen 31, and each of the customer's seats comprises: an outer table 34 having a shape formed by partially cutting a circle; a disk-shaped turntable 35 provided at a center portion of the outer table 34; and a plurality of seats 36—36 arranged along a peripheral portion of the outer table 34, wherein the outer tables 34 are laid out so that the cutout portions of the respective outer tables 34 face the kitchen 31. The cutout portion constitutes an arrival portion 32a at which the carrier wagon 33 arrives, and the carrier wagon 33 approaches to the turntable 35 while the front portion of the wagon is directing to the turntable 35 at this arrival portion. The turntable 35 provided to a center portion of the outer table 34 has a disk shape on which the dishes carried by the wagon are retained, and the turntable 35 is provided so as to freely turn along a horizontal surface.

Further, at predetermined two portions on a ceiling of this restaurant R are respectively provided with a transmitters 40, 40 constituting a traveling route guiding means for guiding the carrier wagon 33 to a destination, and the carrier wagon 33 is guided within the floor of the restaurant R on the basis of the signals transmitted from the transmitters 40, 40 thereby to go back and forth between the kitchen 31 and the customer's seats 32—32. In this connection, the transmitters 40, 40 always transmit a time data.

Figure 8:
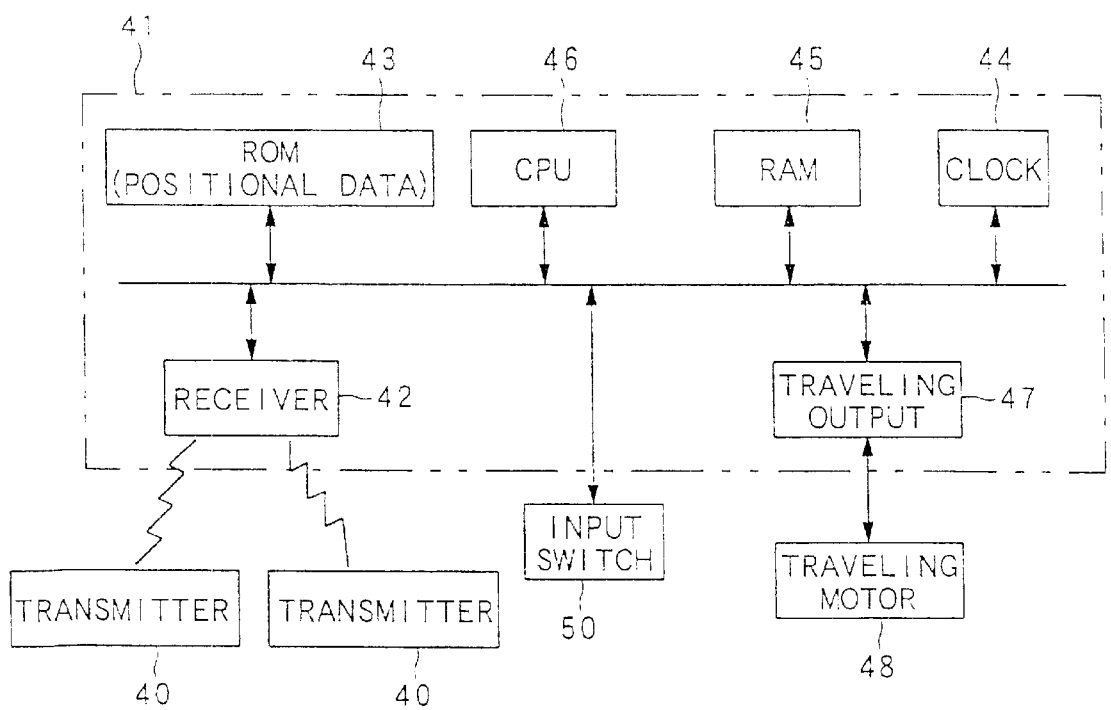
FIG. 8 is a block diagram showing a control system for controlling a traveling of the carrier wagon of the automatic dish serving system applied to the restaurant shown in FIG. 7.

As shown in FIG. 8, the traveling route guiding means for guiding the carrier wagon 33 comprises: the two transmitters 40, 40 attached to the ceiling and a controller 41 provided to the carrier wagon 33. The controller 41 is provided with a ROM device 43 for memorizing positional data of the kitchen and arrival portion formed to the customer's seats or the like and a clock 44 for grasping a present time. These data are timely written into the RAM device and subsequently processed by the CPU 46. The processed value is outputted to a travel outputting portion 47 as as to control a traveling motor 48. The carrier wagon is equipped with an input switch 50 for inputting a seat number as the destination to which the dish is carried, the input switch 50 being operated at the kitchen.

In this embodiment, the floor of the restaurant is regarded as X-Y coordinate system, the coordinate of the present position of the carrier wagon is calculated by the traveling route guiding means. Then, the calculated coordinate of the present position is compared with a coordinate of the designated target position to measure a difference therebetween, and the carrier wagon 33 is guided so that the difference is decreased to be zero.

According to this traveling route guiding means, the carrier wagon 33 is guided to the target position in the following manner. Namely, the carrier wagon 33 receives the signals transmitted from the transmitters 40, 40, and the controller provided for the carrier wagon 33 sequentially calculates the present position of the carrier wagon 33. The present position of the carrier wagon 33 is calculated as a coordinate.

Figure 9:
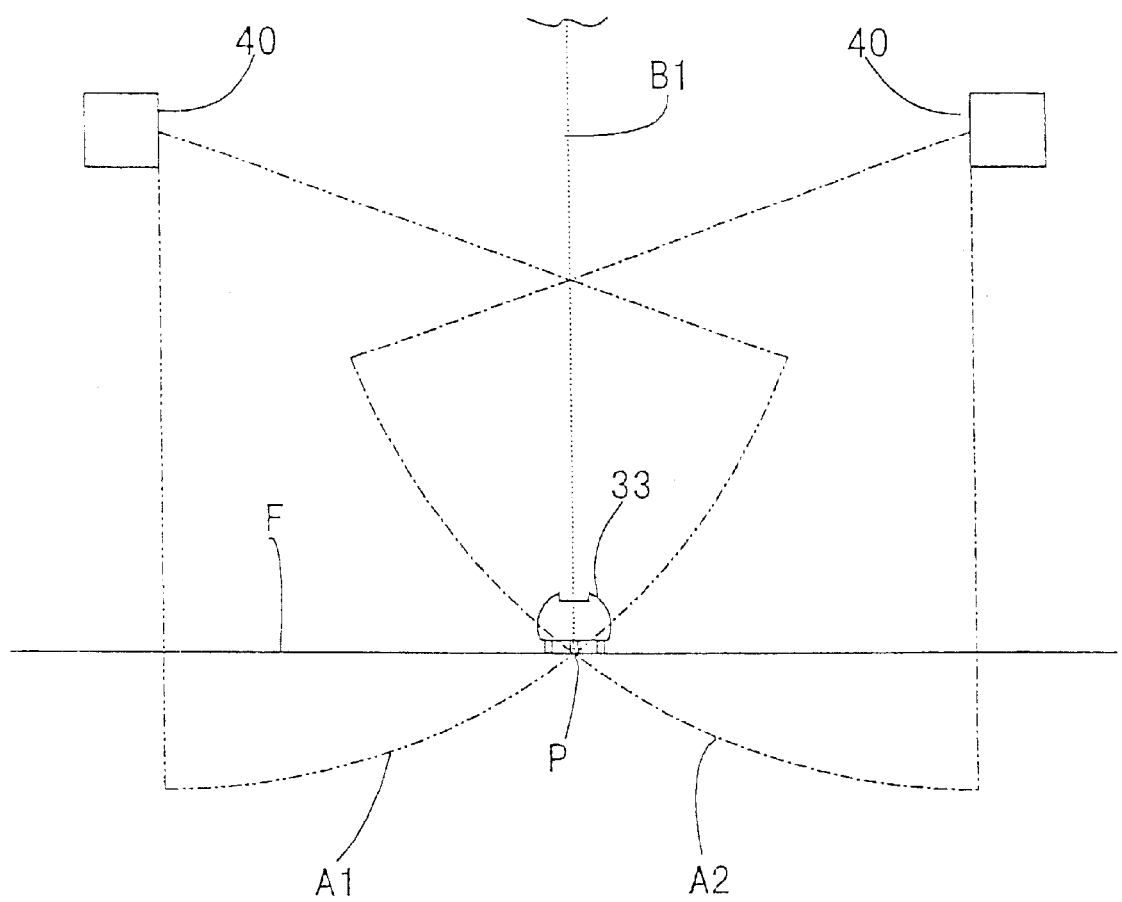
FIG. 9 is an explanatory view showing a principle for specifying a present position of the carrier wagon.

The present position of the carrier wagon 33 is obtained by calculating distances between the respective two transmitters 40, 40 and the carrier wagon 33 on the basis of a principle as shown in FIG. 9. Each of the signals A1, A2 transmitted from the transmitters 40, 40 spreads over a spherical space from a center of the respective transmitters 40, 40 at a constant speed. In this regard, among the signals A1, A2 spreading over the spherical spaces, FIG. 9 partially shows only the signals passing through fan-shaped cross sections for the sake of simplicity.

One circle B1 is specified in a three dimensional space by continuously connecting the intersection points at which the two signals A1, A2 transmitted from the transmitters 40, 40 are intersected. The carrier wagon 33 is considered to exist at any one of positions on the specified circle B1. However, since the carrier wagon 33 exists on the floor F of the restaurant, there can be specified only one point P where the a circumference line of the circle B1 and the floor line F are intersected whereby the present position of the carrier wagon 33 is specified as a point P.

In this regard, a distance between each of the transmitters 40, 40 attached to the ceiling and the carrier wagon 33 is calculated from a ratio of a transmitting speed of the signal to a time difference between the time data received by the carrier wagon and a time indicated by the clock provided to the carrier wagon.

When the present position of the carrier wagon 33 is specified, the present position is then compared with a target position thereby to determine a route to travel. The target position is obtained by calling out a coordinate data corresponding to a table number inputted into the carrier wagon 33 at the kitchen, the coordinate data as the positional data are previously memorized in the ROM device of the controller. For example, assuming that the coordinate of the specified present position is (X0, Y0) and the coordinate of the arrival portion of the customer's seat as the target position is (X2, Y2), in order to get to the target position, it is sufficient for the carrier wagon to travel for a distance of (X2-X0) in a X direction and for a distance (Y2-Y0) in a Y direction. On the basis of the direction and distance calculated as above, the traveling motor is controlled by the controller provided to the carrier wagon 33, whereby the carrier wagon 33 shall travel.

In this regard, a front portion of the carrier wagon 33 is also provided with a camera for judging whether there exsits an obstacle ahead or not. On the basis of an image from the camera, the carrier wagon 33 is controlled to perform any one of operations of stop, detour and retraction.

Hereinbefore, the present invention has been explained with reference to the embodiment in which the position of the carrier wagon is specified by a distance between the transmitter and the carrier wagon. However, the present invention is not limited thereto and may be also constituted so that an angle between lines connecting each of the transmitters and the carrier wagon is detected and the position of the carrier wagon is specified on the basis of the angle.

Next, we will start to explain about an operation in a case where the dish carried by the carrier wagon is served to the turntable provided to the customer's seat and an operation in a case where empty plates or the like returned to the turntable after taking a meal are withdrawn.

Figure 10:
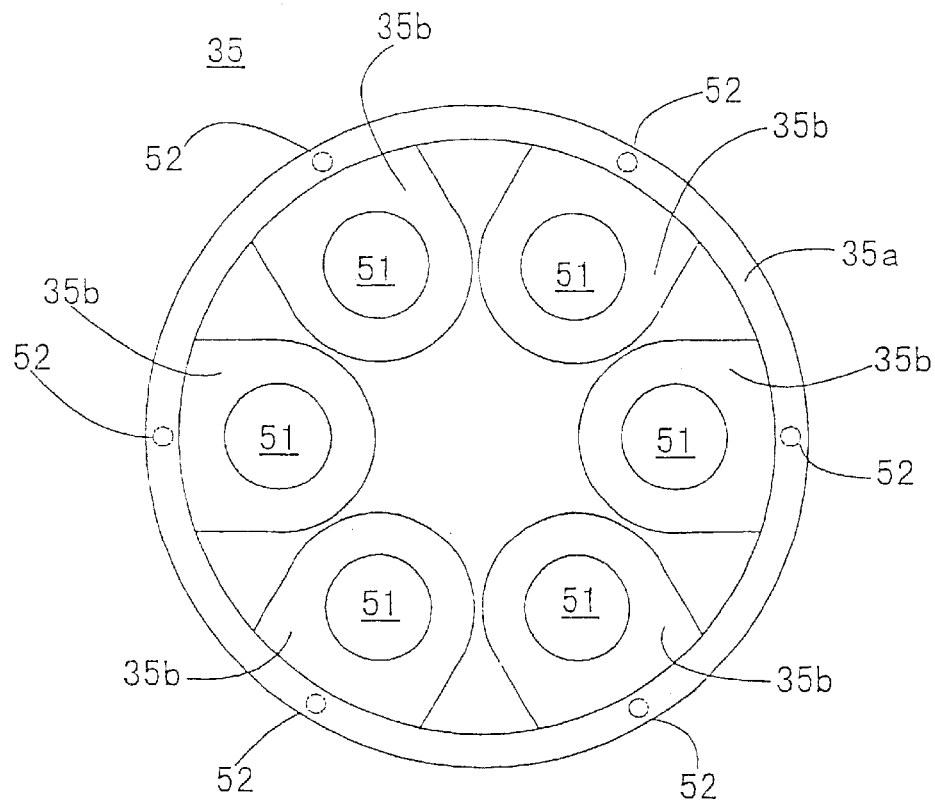
FIG. 10 is a plan view showing a turntable provided to a customer's seat.
Figure 11:
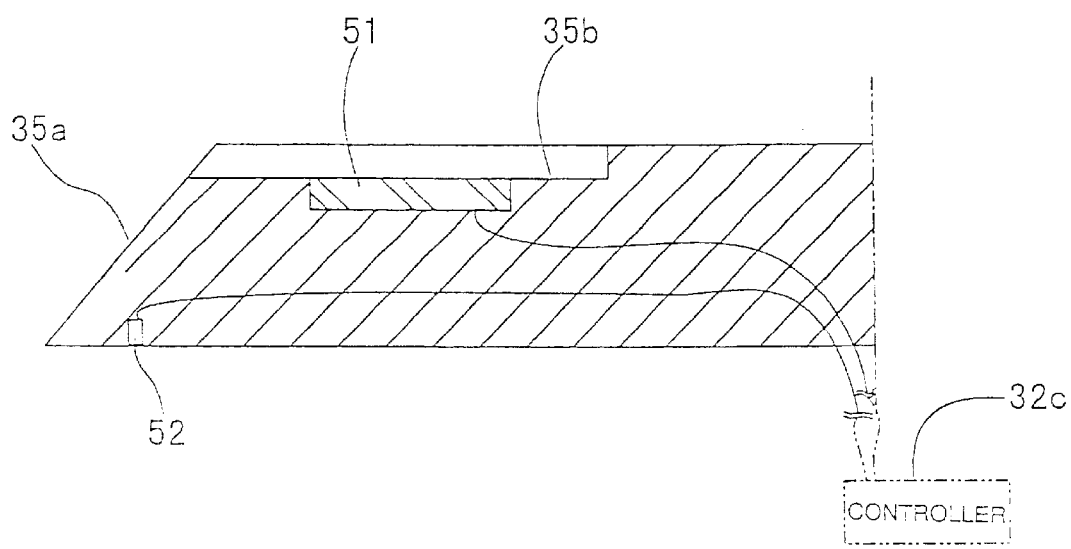
FIG. 11 is a longitudinal cross sectional view of the turntable shown in FIG. 10.

As shown in FIGS. 10 and 11, a peripheral portion 35a of the turntable 35 provided to the customer's seat is formed to have an inclined surface whereby the turntable 35 takes a flat frustum shape. An upper surface of the turntable 35 is provided with a plurality of tray-receiving portions 35b—35b capable of being placed with the carried dish together with the tray so that the tray-receiving portions are evenly arranged along in a circumferential direction.

Each of the tray-receiving portions 35b—35b is provided with a load sensor 51—51 respectively for judging whether an article is placed on the tray-receiving portion or not. Further, a lower surface of the turntable 35 is provided with status signal transmitters 52—52 for each transmitting a status signal indicating whether a dish or the like is placed on the tray-receiving portion 35b—35b, and each of the status signal transmitters 52—52 is attached to a portion slightly inside from the peripheral portion corresponding to the respective tray-receiving portions 35b—35b, so that the status signal is transmitted to the carrier wagon 33.

The signal detected by the load sensor for detecting whether the tray is loaded on the tray-receiving portion or not is transmitted to the controller provided to the customer's seat, so that the number of times of the tray being loaded on the respective tray-receiving portions is counted, whereby the signal indicating whether the tray is loaded or not and the signal indicating the number of loading times are transmitted to the status signal transmitters 52—52.

Figure 12:
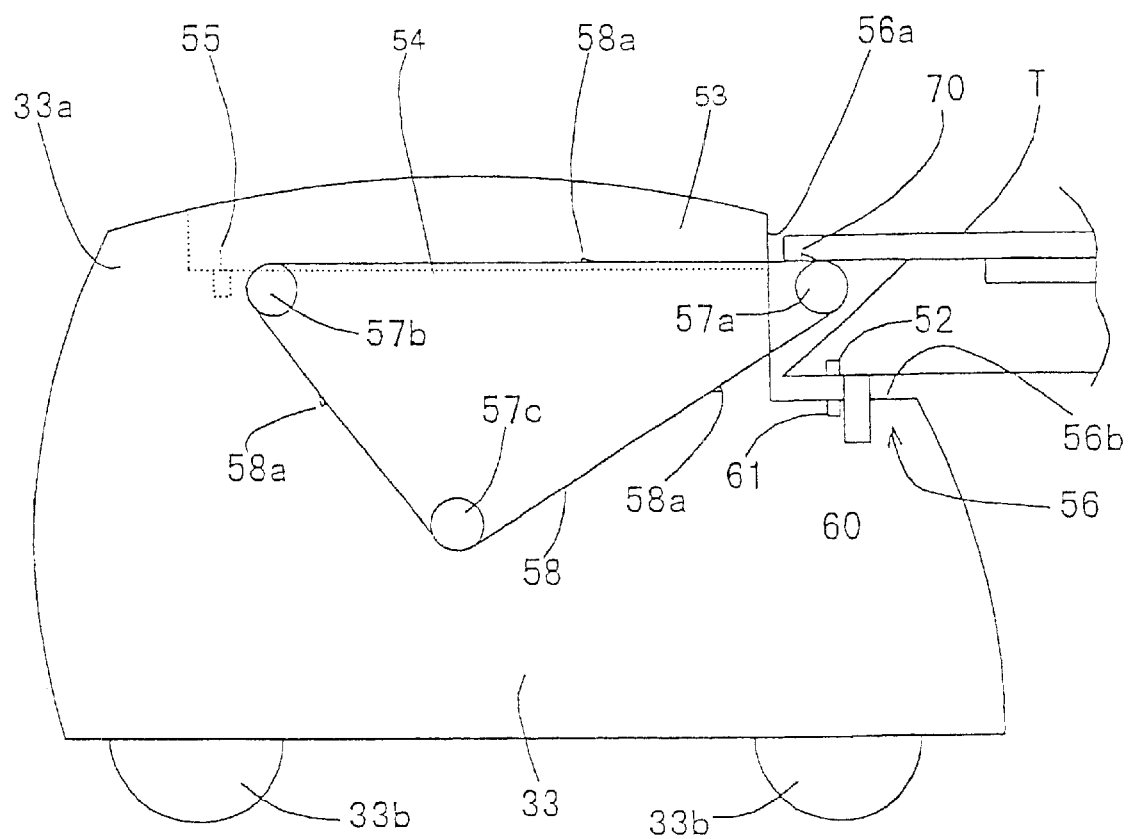
FIG. 12 is an explanatory view schematically showing the carrier wagon to be used in the automatic dish serving system according to the present invention.

On the other hand, as shown in FIG. 12, the carrier wagon 33 is formed so as to have an entire configuration like a ladybug and the carrier wagon comprises: a body 33a and wheels 33b—33b for traveling the carrier wagon 33. An upper central portion of the body 33a is recessed so as to have a rectangular-shape thereby to form a loading portion 53. The loading portion 53 is provided with a conveyor 54 for transferring the food and drink or the like together with the tray to the tray-receiving portion 35b—35b of the turntable 35. This loading portion 53 is also provided with a limit switch 55 so as to judge whether an article is loaded or not. Further, a front portion of the carrier wagon 33 is provided with a table entering portion 56 formed by cutting out an upper surface of the front portion.

The conveyor 54 as the transfer means provided to the carrier wagon 33 is equipped so that a belt 58 is wrapped around three belt wheels 57a, 57b, 57c arranged at three corner portions of a triangular region. Among the three belt wheels 57a, 57b and 57c, the belt wheels 57a, 57b provided at front and rear end portions of the conveyor are provided at a portion having almost the same height as that of a bottom surface of the loading portion 53 of the carrier wagon 33, while the remaining one belt wheel 57c is provided at a portion realizing that an inclined angle of a line connecting the belt wheel 57c to the belt wheel 57b provided to the front end portion is almost the same as the inclined angle of the peripheral portion 35a of the turntable 35. A top end portion of the conveyor 54 is forwardly overlying from an end surface 56a of the table entering portion 56 formed to the front portion of the carrier wagon 33, so that the top portion of the conveyor 54 can approach to a portion most nearest to the inclined peripheral portion 35a of the turntable 36.

In this connection, in the above conveyor 54 shown in this figure, although the inclined angle of the line connecting the belt wheel 57b to the belt wheel 57c is set to almost the same as the inclined angle of the peripheral portion 35a of the turntable 35, there are no limitations in specifying this inclined angle as far as the top portion of the conveyor can smoothly approaches the peripheral portion of the turntable. Further, as the same manner as in the first embodiment, the conveyor may also be formed by wrapping a belt on a pair of belt wheels provided at front and rear portions of the carrier wagon.

In addition, at a bottom portion 56b of the table entering portion 56 is provided with a turning roller 60 for turning the turntable 35, and when the top portion of the conveyor 54 approaches the peripheral portion 35a of the turntable 35, the top portion abuts against a lower surface of the turntable 35. Further, the bottom surface 56b of the table entering portion 56 has a built-in receiver 61 for receiving a signal from the status signal transmitter 52 provided to the aforementioned customer's seat.

Each of the customer's seats accommodated in the automatic dish serving system according to the present invention comprises the following four patterns of states: i.e. a state where there is nothing placed on the tray-receiving portion of the turntable; a state where a tray loaded with dish is placed on the tray-receiving portion; a state where the tray loaded with dish is manually taken away and removed from the tray-receiving portion; and a state where the tray loaded with empty dishes after taking a meal is placed on the tray-receiving portion. The signal to be transmitted and received between the customer's seat and the carrier wagon is a signal indicating what the tray-receiving portion is in a state.

As shown in Table 1, the signal to be transmitted and received between the customer's seat and the carrier wagon is a signal indicating whether an article is placed or not on the tray-receiving portion of the turntable and indicating how the placed article is placed on the tray-receiving portion. The signal is composed of two bits, and a first bit signal indicates whether the article is placed or not on the tray-receiving portion, while a second bit signal indicates: a state where the tray-receiving portion has been empty from the beginning, or a state where the tray is taken away by a person from the tray-receiving portion in case of the tray-receiving portion being empty.

Table 1

| State of Tray-receiving Portion of the Turntable | Status Signal |
| --- | --- |
| Initial state or State after the carrier wagon removed the tray. | "00" |
| State after the carrier wagon placed the tray | "01" |
| State after a person removed the tray. | "10" |
| State that the tray placed with empty dishes or the like after taking meals is loaded. | "11" |

A first row of Table 1 indicates: an initial state that there is nothing placed on the turntable because, for example, a time is not still passed from an opening time of business for the restaurant R; or a state after the tray is removed from the tray-receiving portion by the carrier wagon 33. At this state, the status signal is expressed as "00". In this case, since the first bit signal is "0", it is indicated that the turntable is in a state capable of receiving the dish or the like from the carrier wagon 33. In addition, since the second bit signal is also "0", it is indicated that the carrier wagon 33 took away the tray from the tray-receiving portion.

A second row of Table 1 indicates a state that the tray is placed by the carrier wagon 33. Since the first bit signal is "1", this signal firstly indicates a case where the article send out with the tray from the carrier wagon 33 is counted once. In addition, the second bit signal is "0", this signal indicates a state that the article has never been taken away from the tray-receiving portion and the article sent out with the tray from the carrier wagon 33 is loaded as it is.

A third row of Table 1 indicates a state that the tray loaded with dish is taken away by a person. Since the first bit signal is "0", this signal indicates that the tray-receiving portion is empty. In addition, the second bit signal is "1", this signal indicates that a fact of the tray being taken away by a person is counted once.

Finally, a fourth row of Table 1 indicates a state that the tray is taken away by a person, thereafter, the person again placed another tray on the tray-receiving portion. Since the first bit signal is "1", this signal indicates that the tray-receiving portion is occupied. In addition, the second bit signal is also "1", this signal indicates that the tray is placed by the people without receiving a signal from the carrier wagon 33. This case means a state that an empty dish after taking meal is loaded on the placed tray.

Figure 13:
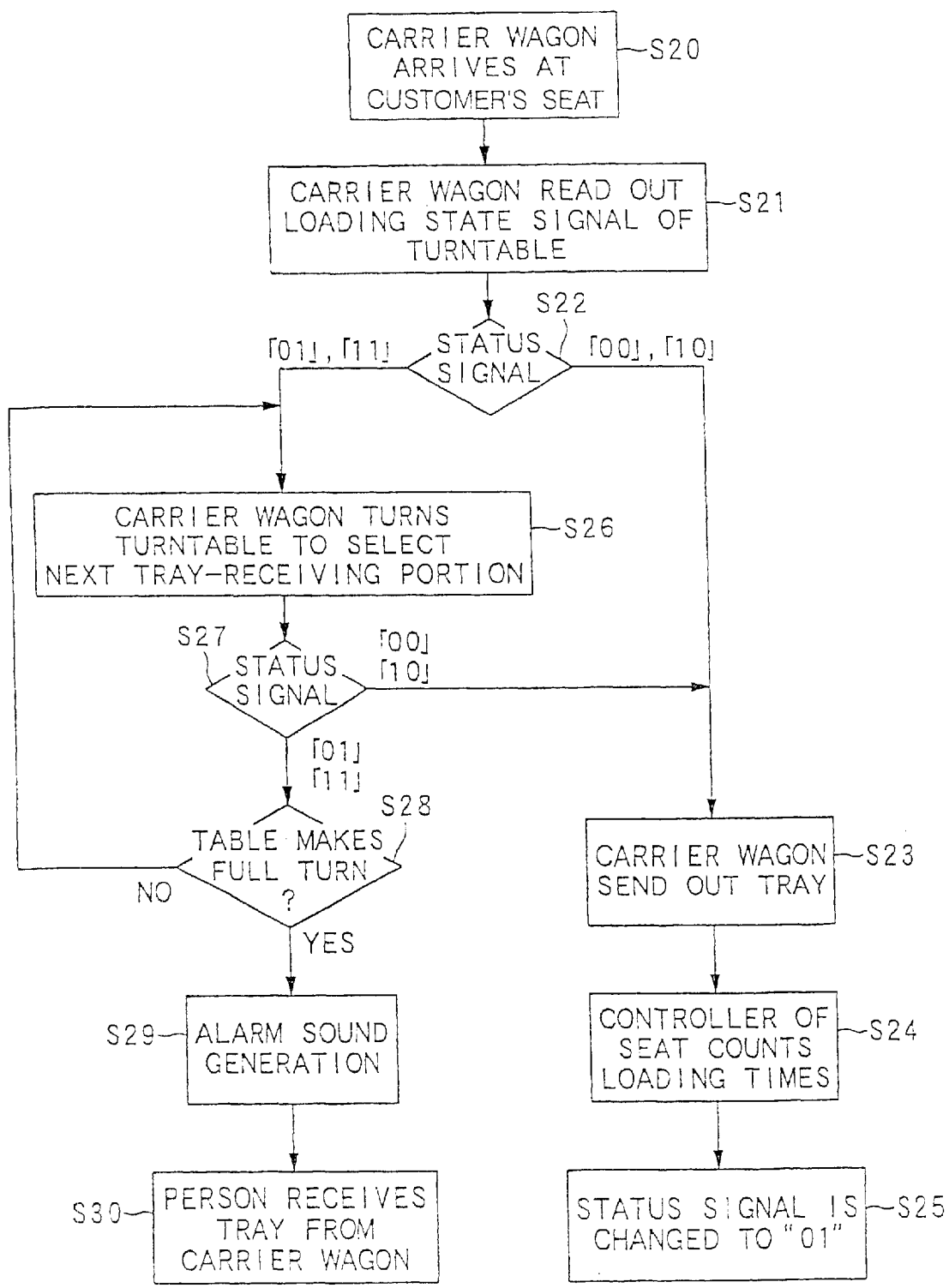
FIG. 13 is a flow diagram showing an operational flow when a tray loaded with dish articles is transferred between the carrier wagon and a turntable at the customer's seat.

While the above signals are transmitted and received between the customer's seats and the carrier wagon 33, the transfer of the dish or the like is performed in accordance with a flow diagram shown in FIG. 13. When the carrier wagon 33 loaded with dish together with the tray arrives at a customer's seat (S20), the carrier wagon 33 reads out the state signal thereby to judge whether a tray-receiving portion of this side is empty or not (S21, S22). If the state signal is "00" or "10", the tray loaded with dish is sent out to the tray-receiving portion (S23). At this time, in order to recognize that the tray is firstly loaded on the tray-receiving portion, the controller provided to the customer's seat counts the loading times as once (S24). As a result, the state signal is changed to "01" (S25).

On the other hand, if the carrier wagon receives the state signal of "01" or "11" from the customer's seat (S22), the tray-receiving portion is recognized to be occupied, so that the turntable is turned (S26). Then, the carrier wagon receives a signal about a next tray-receiving portion to thereby judge whether the next tray-receiving portion is empty or not (S27). If the next tray-receiving portion is empty, the tray is sent out to the tray-receiving portion (S23). If the tray-receiving portion is occupied, the carrier wagon further turns the turntable so as to select a next tray-receiving portion. During the making a full turn of the turntable, the above operations are subsequently repeated whereby the carrier wagon judges whether there is an empty tray-receiving portion on the turntable or not (S26–S28).

Further, if there is no empty tray-receiving portion, an alarm sound is generated (S29) thereby to call customer's attention to receive the carried dish at the customer's seat (S30). When the tray is taken away from the carrier wagon, a signal is transmitted from the limit switch provided to the loading portion of the carrier wagon, so that the carrier wagon recognizes that the loading portion is in an empty state, whereby the carrier wagon returns to the kitchen.

Furthermore, in a case where the carrier wagon loaded with nothing on the loading portion arrives at the customer's seat and a tray loaded with empty dishes is withdrawn, a tray-receiving portion loaded with empty dishes with a tray transmits a signal of "11" indicating a state that the tray loaded with the empty dishes after taking meal is placed on the tray-receiving portion, and the turntable is turned till the tray-receiving portion transmitting the signal is positioned in front of the carrier wagon. Then, the carrier wagon takes the empty dishes together with the tray into the carrier wagon so as to withdraw the empty dishes. In this case, as shown in FIG. 12, the aforementioned conveyor 54 is reversely rotated, and an engaging hook 58a of the conveyor 54 is engaged with an engaging groove 70 formed to a lower surface of the tray T thereby to take the tray T into the carrier wagon, so that the tray T loaded with empty dishes is carried to the returning portion of the kitchen.

Next, a leftover collecting system for taking away or collecting leftover such as tableware including the empty dish left at seats after taking meal will be explained with reference to FIG. 14.

In the leftover collecting system shown in the above figure, an outer table 34 provided for the customer's seat 32 is disposed so as to be turnable along a circumference of the turntable 35, and an outer side of the outer table 34 is provided with a collecting device 80 for collecting articles left on the table. The collecting device 80 is different from the carrier wagon and is controlled to go back and forth between the kitchen and the customer's seats. The device 80 comprises: a cylindrical bucket portion 81 for retaining the withdrawn tableware or the like; and a falciform collecting arm attached to an upper surface of the bucket portion 81. One end portion of the collecting arm 82 is pivotably attached to a shaft 83 thereby to swing in a radial direction of the customer's seat 32. Further, the collecting device 80 is also provided with a turning roller 84 as the same manner as in the carrier wagon. When a top portion of the turning roller 84 abuts against a lower surface of the outer table 34 and the turning roller 84 is driven, the outer table is turned.

Figure 14:
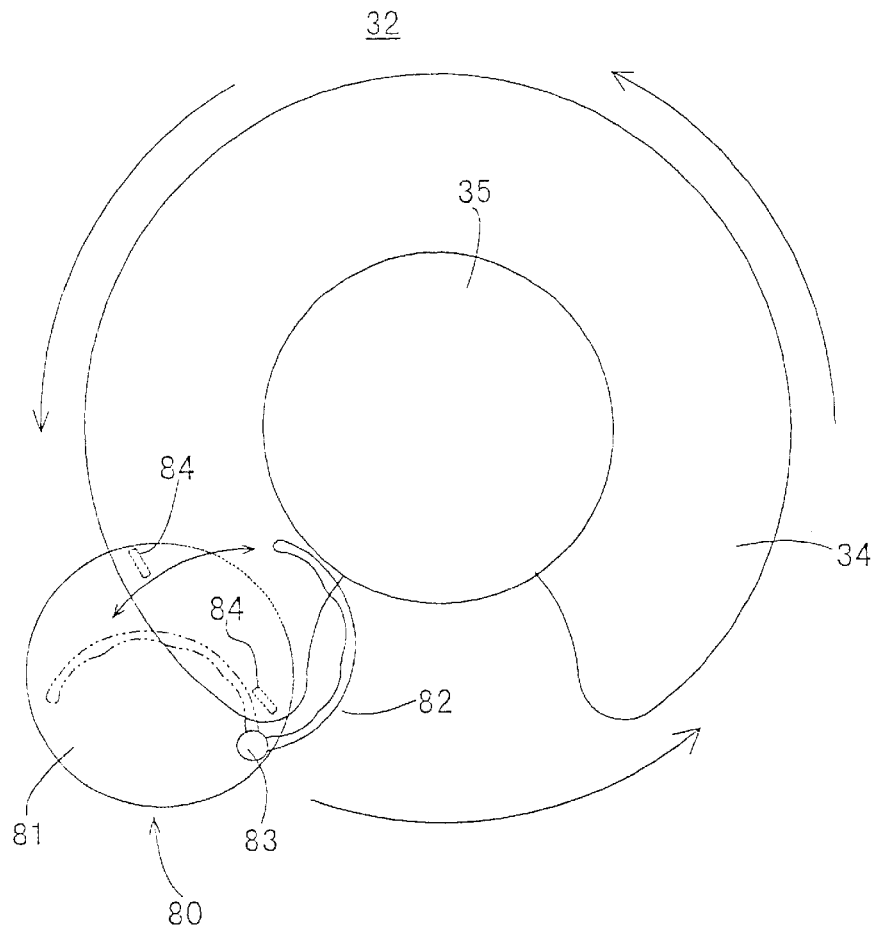
FIG. 14 is a plan view of a customer's seat comprising a leftover withdrawing means.

In a case where the tablewares left on the table are withdrawn and collected, as shown in FIG. 14, the collecting device 80 is moved to one end portion in a circumferential direction of the outer table 34. Then, the turning roller 84 is driven so as to turn the outer table 34 along an outer circumferential surface of the turntable 35, whereby the tableware left on the outer table 34 are transferred towards the collecting device 80. The transferred tableware are caught on the collecting arm 82 thereby to stay at a position of the collecting device 80. Then, the outer table is turned and immediately before the other end portion in the circumferential direction of the outer table 34 arrives at a position of the collecting device 80, the collecting arm 82 is pivotally moved outwardly in a radial direction of the customer's seat thereby to collecting the tableware into the bucket portion 81.

In this regard, in a case where a wiping-up portion is provided to a lower surface of the collecting arm 82, and when the outer table 34 is reversely turned or turned so as to make a full-turn while the collecting arm 82 is reciprocally moved, a wiping-up work for the outer table 34 can be also performed, thus being very convenient.

Figure 15:
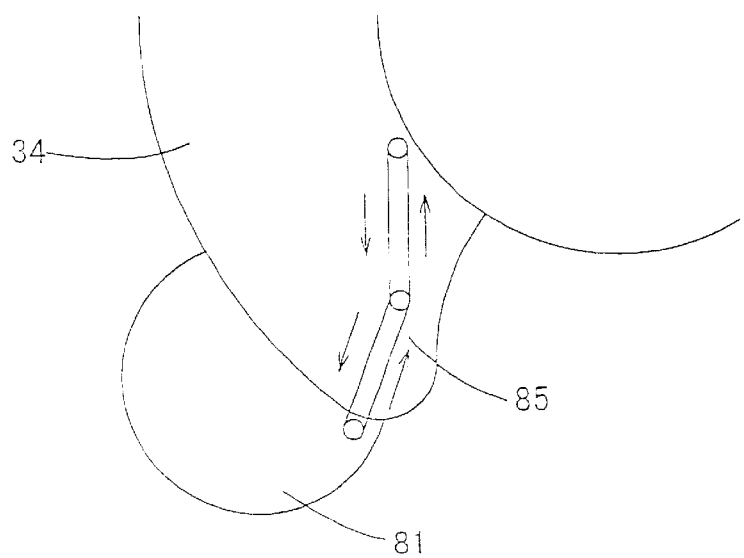
FIG. 15 is a plan view of another embodiment of a withdrawing (recovering) arm different from the withdrawing arm shown in FIG. 14.

Further, the collecting device can be also constituted so that a collecting conveyor 85 is provided to an upper portion of the bucket portion 81 as shown in FIG. 15 in place of the falciform collecting arm thereby to collecting the tableware left on the outer table 34.

As described above, there has been explained a case where the collecting device is separately provided other than the carrier wagon. However, if the above collecting arm 82 or the collecting conveyor 85 is equipped to the carrier wagon, it is not necessary to separately provide the collecting device for the leftover collecting system. In this case, the tableware to be collected by the collecting arm or the collecting conveyor are taken into the loading portion of the carrier wagon.

Third Embodiment

Figure 16:
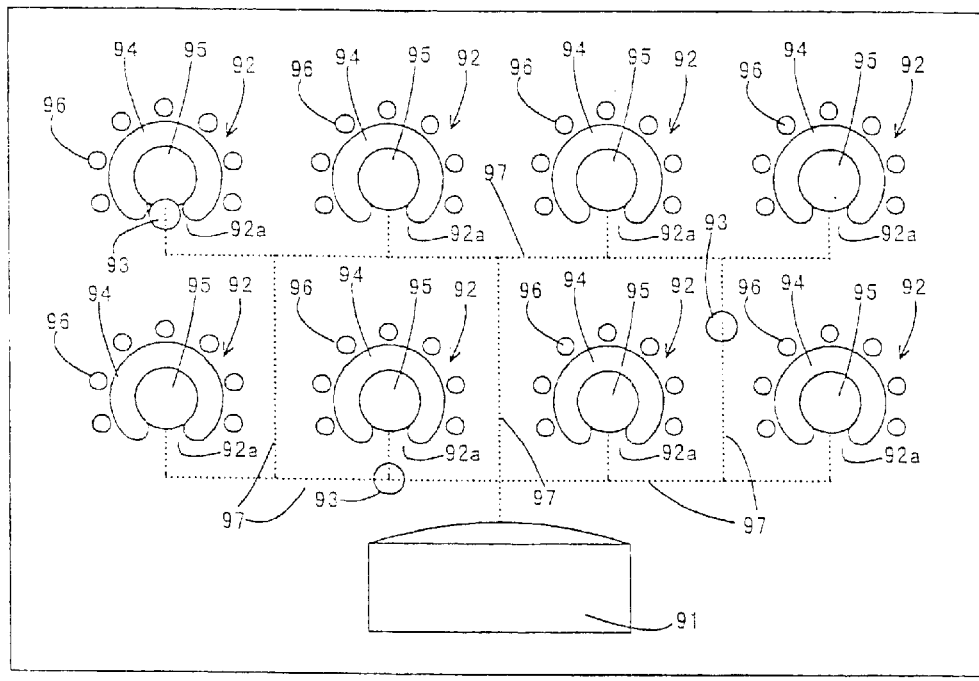
FIG. 16 is a plan view showing a layout of the customer's seats in a restaurant applied with a dish serving system according to third embodiment of the present invention.
Figure 17:
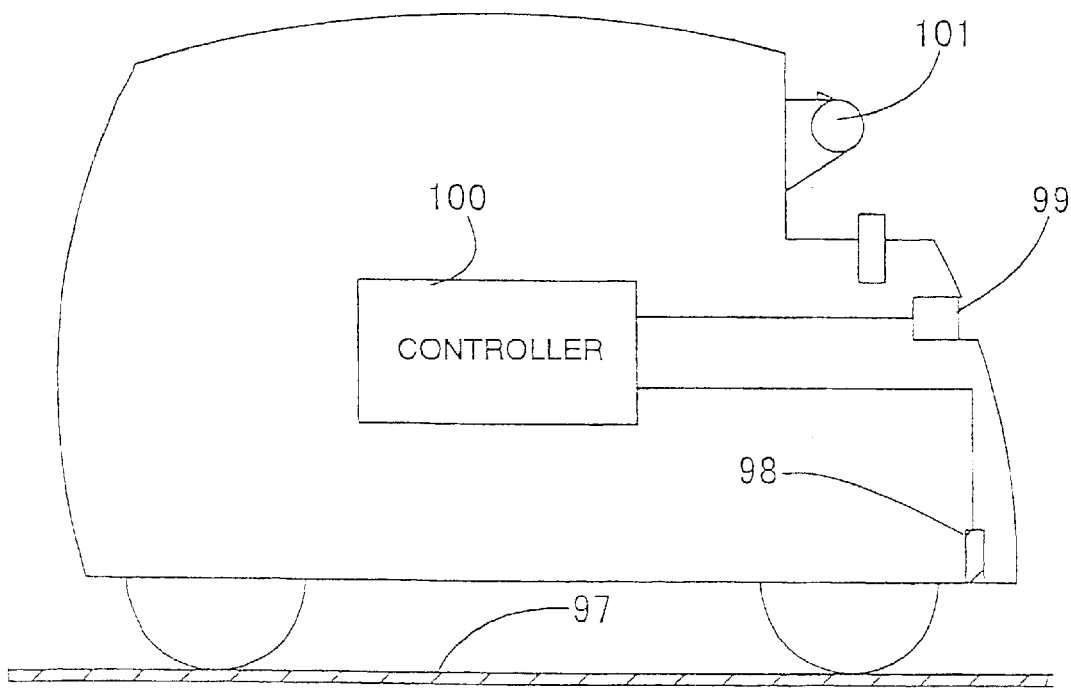
FIG. 17 is a schematic view showing a travel controlling system and an obstacle bypassing controlling system of the carrier wagon used in the restaurant shown in FIG. 16.

FIGS. 16 and 17 show another embodiment of a route guiding means for guiding a route along which the carrier wagon travels.

In this embodiment, the restaurant R to which an automatic dish serving system according to the present invention is applicable also comprises: a kitchen 91 constituting a supply center for supplying dishes of cooked meals; customer's seats 92—92 at which the customer takes the served meal and drink; and carrier wagons 93—93 going back and forth between the kitchen 91 and the customer's seats 92 for carrying the dishes or the like. The customer's seats 92—92 are arranged in two rows, and each of the rows comprises four customer's seats 92—92.

Further, each of the customer's seats 92 comprises: an outer table 94 having a donut-shape formed by partially cutting a circle; a turntable 95 provided at a center portion of the customer's seat 92 and provided at inside the outer table 94; and a plurality of seats 96—96 for the customers to take thereon, the seats 96—96 being arranged along a peripheral portion of the outer table 94. The cut out portion formed by partially cutting out the outer table 94 constitutes an arrival portion 92a at which the carrier wagon arrives.

At a floor surface of this restaurant R is provided with guide cables 97—97 constituting the route guide means for guiding the carrier wagon 93 so as to connect the kitchen 91 to the arrival portion 92a—92a of each of the customer's seats 92—92. This guide cable is composed of a long and narrow strip-shaped substance exhibiting magnetic property, and the guide cable is embedded in a floor surface.

On the other hand, at a bottom surface of the carrier wagon 93 is provided with a magnetic sensor 98 constituting a part of the route guiding means so as to direct to the floor of the restaurant R, and the magnetic sensor 98 detects the guide cable embedded in the floor surface. The magnetic sensor 93 detects the guide cable 97 embedded in the floor surface whereby the carrier wagon 93 is controlled by the controller 100 provided for the carrier wagon 93 so as to travel along the guide cable 97.

In addition, a front surface of the carrier wagon 93 is provided with a sensor 99 such as camera or infrared sensor, or the like for detecting an obstacle, so that the carrier wagon 93 is prevented from colliding with a person during the traveling of the carrier wagon 93. In this case, in order to avoid the collision with people constituting an obstacle by a simple way, a detouring means is not specifically required. but it is sufficient for the carrier wagon to be controlled so as to stop for a while till the person passes through a portion in front of the carrier wagon.

This route guide means is an effective means for simply guiding the carrier wagon with a low cost in the case of the present embodiment in which the customer's seats 92—92 to be provided to the restaurant R are not arranged at portions radially from the kitchen 1, whereby the carrier wagon 93 cannot be linearly moved. In this regard, in a case where the tray or the like loaded with a dish is transferred at the respective customer's seats 92, such transferring operation can be performed by using the conveyor 101 in the same manner as in the aforementioned embodiment.

Figure 18:
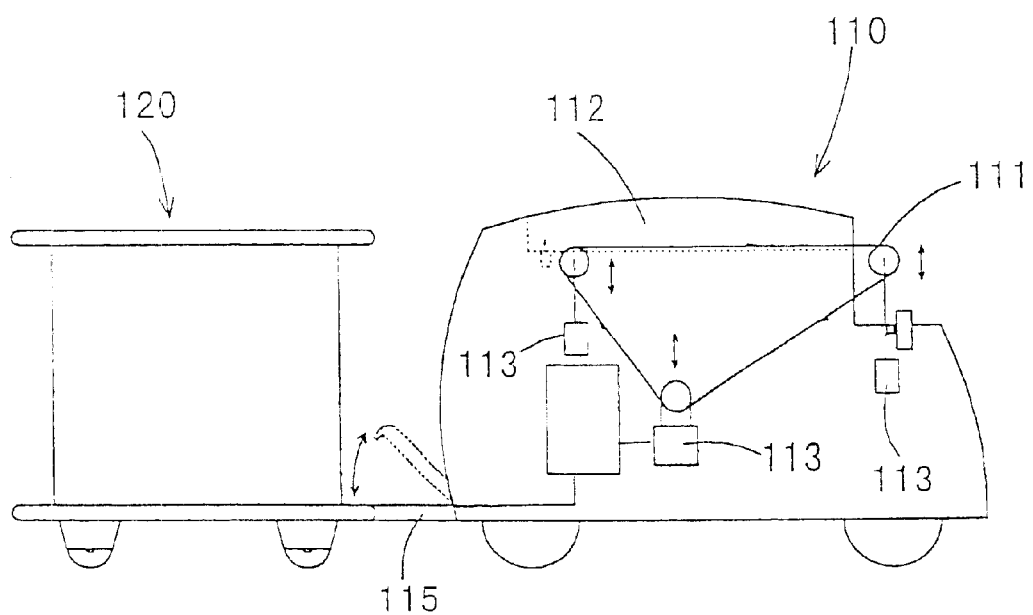
FIG. 18 is a side view showing a state where another wagon is coupled to the carrier wagon.

As described above, there has been explained about the embodiment in which one carrier wagon is solely traveled. However, the present invention is not limited to this embodiment. FIG. 18 shows an embodiment in which a wagon 120 having no driving source is linked up to the carrier wagon 110, so that the wagon 120 is trailed and traveled by the carrier wagon 110.

For example, an operation will be explained with reference to a case where the carrier wagon 110 linked up with the wagon 120 is used at the restaurant shown in FIG. 1. In this embodiment, the dish is loaded on the wagon 120, the dish loaded on the wagon 120 is served to a turntable (reference numeral 5 in FIG. 1), and empty tableware or the like placed on the turntable 5 are collected to be loaded on the wagon.

The wagon 120 is linked up by a linking hook 115 provided to a rear end portion of the carrier wagon 110. The linking hook 115 is provided so as to be rotatable around a root portion of the linking hook 115, the root portion acting as a rotation axis. The linking hook 115 is vertically rotated by a command of the controller (not shown) embedded in the carrier wagon 110. While the dish is conveyed from the kitchen (reference numeral 1 in FIG. 1) to the customer's seat (reference numeral 2 in FIG. 1) and while the tableware are conveyed from the customer's seat 2 to the kitchen 1, the linking hook 115 is descended so as to be able to link up to the wagon 120 and to trail the wagon 120. On the other hand, when the carrier wagon 120 is arrived at the customer's seat 2, the linking hook 115 is upwardly rotated thereby to release the linkage of the wagon.

Figure 19:
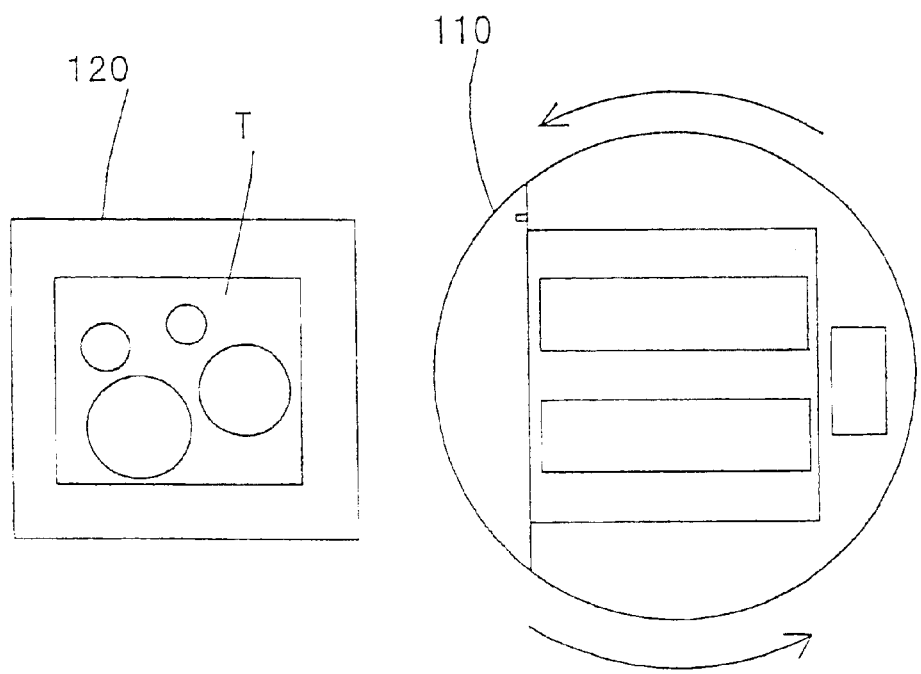
FIG. 19 is a plan view showing a state where the carrier wagon is turned around.
Figure 20:
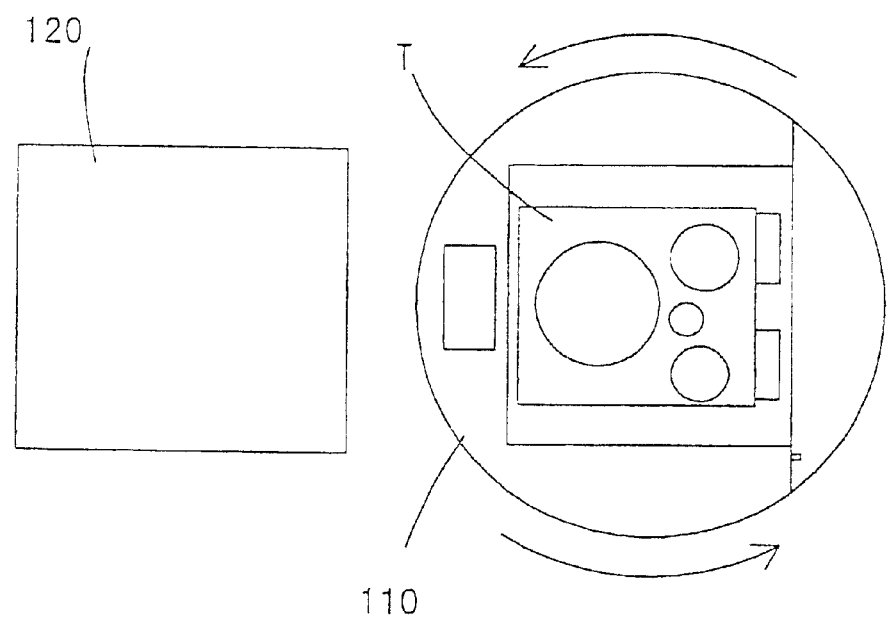
FIG. 20 is a plan view showing a state where the tray is loaded on the carrier wagon and the carrier wagon again turns so as to face forward.

When a tray T placed with dishes loaded on the wagon is served to the turntable, the carrier wagon makes a spin-turn at the serving point at an amount of 180 degrees, so that the front portion of the carrier wagon 110 is directed to the wagon 120 (a state shown in FIG. 19). Then, the conveyor 111 of the carrier wagon 110 is driven, so that the tray T loaded with dishes is taken into the loading portion 112 from the wagon 120. Thereafter, the carrier wagon 110 again makes a spin-turn at the serving point, so that the front portion of the carrier wagon 110 is directed to the turntable 5 thereby to serve the tray to the turntable (a state shown in FIG. 20). In the case of withdrawing the tableware or the like from the turntable, it is sufficient to perform operations in reverse order from above operations.

Figure 21:
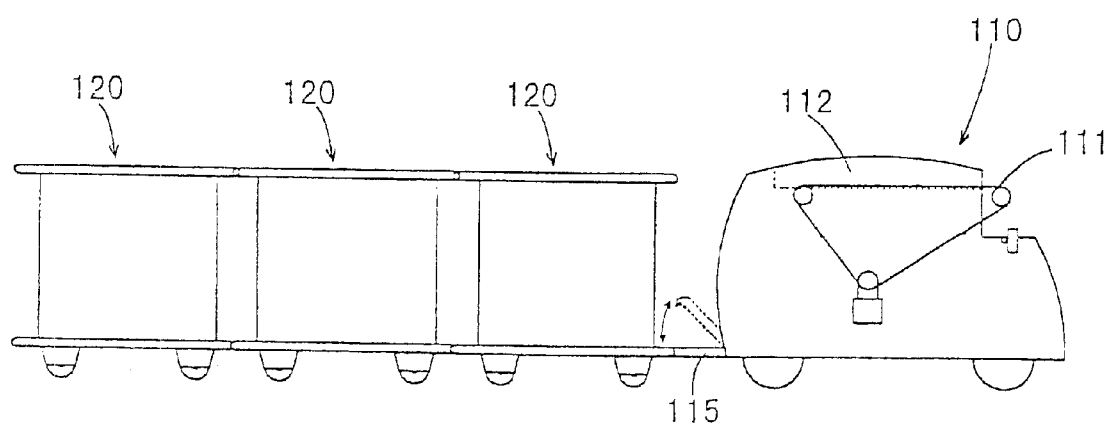
FIG. 21 is a side view showing a state where the carrier wagon is drawing a plurality of wagons serially coupled to each other.

In this regard, the number of the wagons to be linked up to the carrier wagon is not limit to one, and at least two wagons may be linked up to the carrier wagon (see FIG. 21).

In addition, as shown in FIG. 18, the conveyor 111 of the carrier wagon 110 is provided with an adjusting mechanism 113 for finely adjusting a height of the conveyor 111 or a balance between the right and left portions of the conveyor 111. The height of the conveyor 111 is liable to cause a slight difference due to a difference in weights of the dishes to be loaded on the conveyor 111 and the balance of right and left portions of the conveyor 111 is slightly destroyed due to the locations of the dishes to be placed on the tray T In this carrier wagon 110, by the action of the adjusting mechanism 113, the adjusting in the height is performed and the balance between the right and left portions is maintained. In this connection, there has not explained at all about this adjusting mechanism in the carrier wagon 3 shown in FIG. 2 and the carrier wagon 33 shown in FIG. 12. However, if the adjusting mechanism is also provided for the carrier wagons 3 and 33, the adjustment in height and maintaining the balance between the right and left portions can be performed, thus being very convenient.

As described above, according to the present invention, the space used for the automatic dish serving system can be effectively utilized, and it becomes possible to effectively serve the dishes and to clear the tableware with a high efficiency without passing through many hands. In addition, the carrier wagon automatically travels by being guided by the route guiding means, so that it is not necessary for a person to carry and serve the dishes or the like. Further, since the transfer of the articles such as dishes or the like can be also automatically performed even at the customer's seat, a manpower can be also greatly reduced and saved.

What is claimed is:

1. An automatic dish serving system comprising:
   a supply center for supplying dish articles;
   a customer's seat to which the dish articles are served;
   a carrier wagon traveling along a route between the supply center and the customer's seat for carrying the articles loaded on the carrier wagon; and a route guiding means for guiding the carrier wagon so as to take an appropriate route;

wherein said customer s seat is provided with a turntable for retaining the served articles and provided with an arrival portion at which the carrier wagon arrives and said carrier wagon is provided with a transfer means for transferring the articles between the turntable and the carrier wagon; and said transfer means of the carrier wagon is provided with a conveyor movable in forward and backward direction of the carrier wagon, a front portion of said carrier wagon is provided with a table entering portion for entering a peripheral portion of the turntable into a portion inside from a front end surface of the carrier wagon so that the peripheral portion of the turntable is approached to a portion close to a top portion of the conveyor.

2. An automatic dish serving system according to claim 1, wherein said dish serving system further comprises a tray for performing a transfer of the articles between the carrier wagon and the turntable, and the conveyor comprises a belt provided with an engaging hook for being engaged with an engaging portion formed to said tray, so that said engaging hook is engaged with the engaging portion thereby to withdraw the tray.

3. An automatic dish serving system according to claim 1, wherein said dish serving system further comprises: a loading state judging means provided to said carrier wagon for judging whether the article is loaded on the carrier-wagon or not; a retaining state judging means for judging whether the article is retained on said turntable or not; and a table turning means provided at a front portion of said carrier wagon for turning the turntable in response to a signal from said retaining state judging means, wherein said conveyor of the transfer means transfers the article between the carrier wagon and the turntable in response to signals from said loading state judging means and said retaining state judging means.

4. An automatic dish serving system according to claim 3, wherein said carrier wagon further comprises a sound generating means for generating a sound in response to signals from said loading state judging means and said retaining state judging means.

5. An automatic dish serving system according to claim 1, wherein said route guide means comprises: a memory means for memorizing traveling route data for said carrier wagon to travel and the data is read out by a computer; and the computer for reading out the data from said memory means, wherein said automatic dish serving system comprises a plurality of customer's seats and each of the customer s seats is allotted with a different identification code, said carrier wagon comprises an input means for inputting said identification code of the customer's seat to which the articles should be served, said carrier wagon travels along a traveling route ranging from a route previously set for the carrier wagon to a route selected by the route guiding means in response to a signal form the inputting means.

6. An automatic dish serving system according to claim 1, wherein said route guiding means further comprises: a signal transmitting means provided at a predetermined portion of a site for transmitting a signal to the carrier wagon; a position calculating means provided to the carrier wagon for calculating a position of the carrier wagon in the site by receiving the signal from said signal transmitting means; and a travel controlling means for controlling a traveling device for the carrier wagon on the basis of a result obtained by calculating a positional relation between an actual position of the carrier wagon calculated by the position calculating means and a destination point in the site.

7. An automatic dish serving system according to claim 1, wherein said carrier wagon further comprises: an obstacle detecting means for detecting an obstacle existing in front of the carrier wagon; and an obstacle bypassing means for controlling the traveling of the carrier wagon so as to bypass the obstacle in response to a signal from said obstacle bypassing means.

8. An automatic dish serving system according to claim 1, wherein said dish serving system further comprises: an outer controller for remotely controlling said carrier wagon; a transmitting means for transmitting a signal to the carrier wagon, the signal corresponding to an operation of the outer controller; a receiving means provided to the carrier wagon for receiving the signal from the transmitting means; and a controlling means for controlling a movement of the carrier wagon in response to the signal received by the receiving means, wherein said carrier wagon performs a processing corresponding to the signal from said controlling means by giving the processing priority over all the other processing.

9. An automatic dish serving system according to claim 1, wherein said customer's seat comprises a leftover withdrawing system for withdrawing the tableware left on the table.

10. An automatic dish serving system according to claim 1, wherein at least one wagon for loading the articles is coupled to said carrier wagon.

11. An automatic dish serving system according to claim 1, wherein said carrier wagon is provided with an adjusting means for adjusting a vertical position of the conveyor.

* * * * *

UNITED STATES PATENT AND TRADEMARK OFFICE
CERTIFICATE OF CORRECTION

PATENT NO. : 6,557,669 B2
DATED : May 6, 2003
INVENTOR(S) : Katsuyoshi Abekawa

It is certified that error appears in the above-identified patent and that said Letters Patent is hereby corrected as shown below:

<u>Title page,</u>
Item [22], should read as follows:
-- [22] Filed: March 2, 2001 --.

Signed and Sealed this

Twenty-third Day of December, 2003

JAMES E. ROGAN
*Director of the United States Patent and Trademark Office*